US011159656B2

(12) United States Patent
Michon et al.

(10) Patent No.: US 11,159,656 B2
(45) Date of Patent: Oct. 26, 2021

(54) METHODS AND DEVICES FOR GENERATING A PLURALITY OF DATA PACKETS

(71) Applicant: ENYX, Paris (FR)

(72) Inventors: Matthieu Michon, Paris (FR); Laurent de Barry, New York, NY (US)

(73) Assignee: ENYX, Paris (FR)

( * ) Notice: Subject to any disclaimer, the term of this patent is extended or adjusted under 35 U.S.C. 154(b) by 193 days.

(21) Appl. No.: 16/693,828

(22) Filed: Nov. 25, 2019

(65) Prior Publication Data
US 2021/0160351 A1    May 27, 2021

(51) Int. Cl.
*H04L 12/26*    (2006.01)
*H04L 29/08*    (2006.01)
*G06Q 40/04*    (2012.01)
*H04L 12/18*    (2006.01)

(52) U.S. Cl.
CPC .......... *H04L 69/324* (2013.01); *G06Q 40/04* (2013.01); *H04L 12/1804* (2013.01)

(58) Field of Classification Search
None
See application file for complete search history.

(56) References Cited

U.S. PATENT DOCUMENTS

| | | | | |
|---|---|---|---|---|
| 7,233,940 B2* | 6/2007 | Bamberger | ........... | G06F 11/006 |
| 2004/0158498 A1* | 8/2004 | Sherman | ............... | G06Q 10/087 |
| | | | | 705/26.81 |
| 2006/0245555 A1* | 11/2006 | Makela | ................. | G06F 40/174 |
| | | | | 379/88.12 |
| 2020/0211108 A1* | 7/2020 | Pierce | .................... | G06Q 40/04 |
| 2021/0201328 A1* | 7/2021 | Gunther | ................. | G06Q 40/04 |

* cited by examiner

*Primary Examiner* — Zewdu A Beyen
(74) *Attorney, Agent, or Firm* — Faegre Drinker Biddle & Reath LLP

(57) ABSTRACT

The disclosure relates to methods and systems for simultaneously generating a plurality of data packets to be transmitted across a communication network. Each data packet preferably comprises at least one order entry message forming a data payload. In an embodiment, a plurality of memory update data packets is obtained. Directory entries, static message templates and template processing instruction datasets are updated based on the obtained memory update data packets. All the data packets of the plurality of data packets are simultaneously generated according to a sequence synchronized in parallel. According to the sequence, each data packet is generated by processing a selected updated static message template based on a selected updated template processing instruction dataset for a selected updated directory entry. Therefore, the generated data packets can be simultaneously routed and simultaneously transmitted across the communication network.

15 Claims, 19 Drawing Sheets

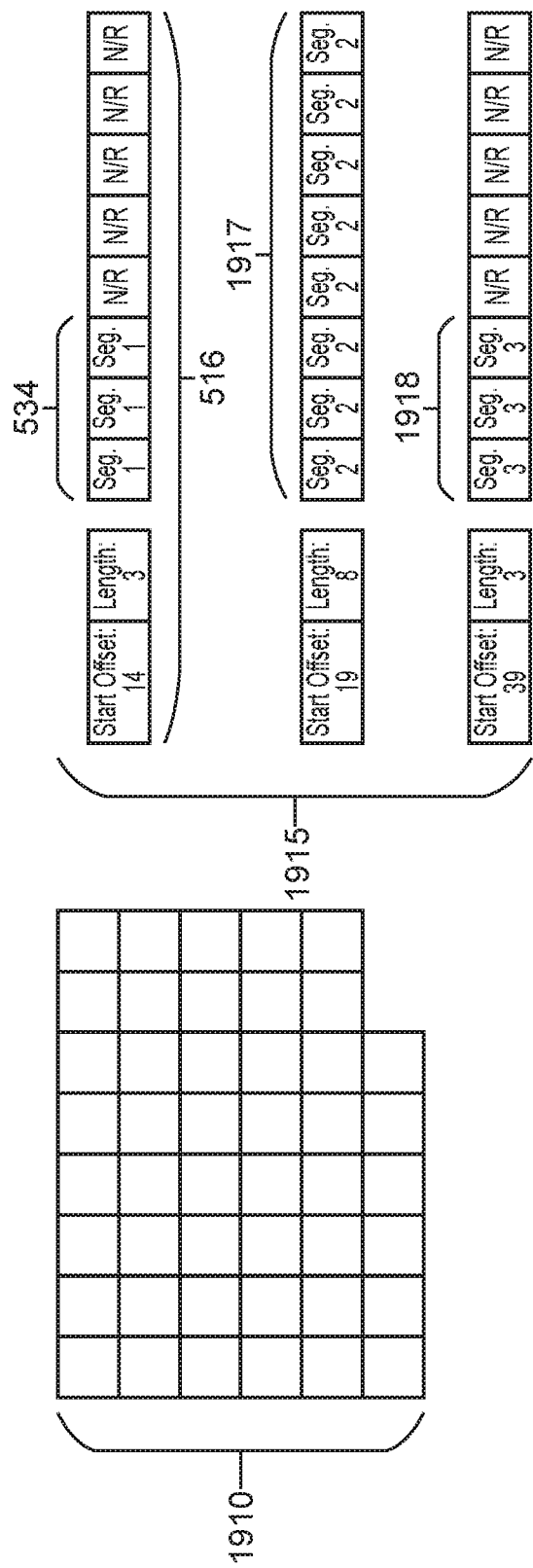
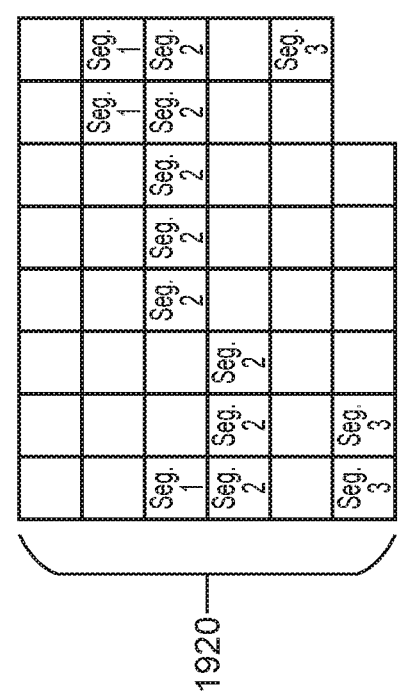
FIG. 19

METHODS AND DEVICES FOR GENERATING A PLURALITY OF DATA PACKETS

FIELD

The present disclosure generally relates to the field of trading industry, and more specifically to data processing for the algorithmic trading industry. In particular, the present disclosure relates to a variety of methods, devices, and non-transitory computer storage media for generating a plurality of data packets.

BACKGROUND

As illustrated in FIG. 1, a financial market or financial exchange 101 is a place where a market participant 102 may trade financial securities with other market participants. Financial exchanges and market participants may communicate between each other through an electronic communication network (ECN), which carries market data messages 120 from the financial exchange 101 to the market participant 102 and order entry request and/or reply messages 121 from the market participant 102 to the financial exchange 101.

As illustrated in FIG. 2, order entry request and reply messages 121, also referred to as trade order update notifications, are typically enclosed as packets forming protocol data units (PDUs) 160. PDUs contain at least one network header 150 (for example Ethernet; IP and TCP) followed by a data payload consisting in one or more order entry messages 151-152-153.

As illustrated in FIG. 3, on a market participant side, such order entry request and reply messages may be generated by an algorithmic trading system 251, which may comprise a feed handler module 252, a trading strategy algorithm logic module 253 and an order entry engine module 254. Market data messages 120 may be decoded using the feed handler module 252 which decodes; filters; updates order books for the relevant securities; and generates update notifications 261. These notifications may then be used by the trading strategy algorithm logic module 253 for implementing a predefined trading strategy. The trading strategy algorithm logic module 253 is thus in charge of updating, analyzing, processing and following market trends and when deemed relevant, updating market positions by issuing trigger requests 262 for order entry messages. The order entry engine module 254 may convert these trigger requests 262 into packets containing one or more order entry messages 121.

The overall latency of the above algorithmic trading system cumulates the latency of all three previous modules 252-253-254. Thus a reduction in latency in either one of the functions provided by these three modules would represent a competitive advantage.

As illustrated on FIG. 4 and FIG. 5, rather than using general-purpose processors (CPU) 221 found in computer servers 220, hardware acceleration relies on logic devices 211 customized for a particular usage. These devices can be designed to be application-specific (ASIC) or re-programmable (FPGA) using an application specific configuration also known as bitstream or FPGA firmware.

In contrast to a software implementation, where a program is stored as data in a data storage device 223 then loaded in a memory 222, such as a RAM memory, and executed sequentially on one or more CPU cores 221, hardware acceleration implements the program in digital logic distributed through-out the logic device 211. This distribution allows massive parallelism only to be limited by the number of logic blocks or interconnect resources 274-279 available on the logic device.

In addition to blocks implementing custom logic in logic blocks 274, logic devices nowadays may also contain high-speed serial interfaces 278, used for implementing high-speed connectivity 280-281 with a computer network using network interface modules 272 such as QSFP or with a computer server CPU 273 using a PCI Express interface 282; embedded static RAM blocks 275; DSP blocks 279; and even complete microprocessors. All these elements are able to operate simultaneously synchronized by one or more clocks driven by external sources 270, allowing a very efficient implementation of pipelined operations.

Hardware acceleration may be offered by populating a circuit board 210 with a logic device 211. This board may be designed to be inserted inside a host computer on a high-speed expansion slot such as PCI Express. Such hardware acceleration boards may also provide network interface modules 213 directly wired to the logic device 211 allowing an implemented logic module to receive and transmit data packets on an electronic communication network or to/from a computer network 201 internal to a market participant. This allows programs implemented as logic modules inside the logic device 211 to directly access financial exchanges as opposed to passing through host network interface controllers 224 and host network interface modules 225 of the host server 220. Software program running on the host server processor 221 may however at any time transfer content into and from the logic device 211 and its dedicated memory 212.

In other implementations on accelerated hardware systems, the process of generating packets containing order entry messages may be done by performing a lookup operation for each field of the message, and then serializing the result of these lookup operations into a contiguous message. This operation is repeated as many times as there are messages to be transmitted in a single packet to be transmitted on the ECN.

These order entry messages may be processed by a matching engine of the financial exchange based on the order of arrival, resulting in instances where an order entry message arriving first could be matched, as opposed to one arriving several nanoseconds later. Since market data updates are distributed to market participants simultaneously, the first market participants to submit order entry messages will have a competitive advantage. As a result, market participant implementing an algorithmic trading system 251 using a strategy algorithm 253 relying on being ahead of competitors have a vested interest in having the lowest latency between the reception of the market data update and the transmission of the relevant order entry messages.

Known implementations of the logic module handling market data decoding and filtering tasks are designed to take full advantage of hardware capabilities.

The present disclosure aims at improving the situation.

SUMMARY

To that end, the disclosure relates to a method for simultaneously generating a plurality of data packets to be transmitted across a communication network, each data packet comprising at least one order entry message forming a data payload, the method comprising executing on a processing circuit:

obtaining a plurality of memory update data packets comprising at least:
  directory type memory update data packets,
  static message type memory update data packets,
  template processing instructions type memory update data packets,
for each directory type memory update data packet, updating a directory entry of a directory, based on said directory type memory update data packet,
for each static message type memory update data packet, updating a static message template, based on the static message type memory update data packet,
for each template processing instructions type memory update data packet, updating a template processing instruction dataset to provide guidance to process an updated static message template, based on the template processing instructions type memory update data packet,
generating simultaneously all the data packets of said plurality of data packets according to a sequence synchronized in parallel and comprising for each data packet:
  obtaining content request data for said order entry message, comprising a request index,
  selecting an updated directory entry based on the request index,
  for the selected updated directory entry, selecting at least one updated static message template and at least one updated template processing instruction dataset based on the selected updated directory entry,
  for the selected updated directory entry, processing the selected updated static message template based on the selected updated template processing instruction dataset to generate the data packet,
routing simultaneously the thusly generated data packets to respective network interface modules for transmitting simultaneously the plurality of generated data packets across the communication network.

A particular advantage provided by the present disclosure is generating order entry messages with a reduced latency and with an improvement of throughput figures compared to known methods using known trading systems. This particular advantage is achieved thanks to the sequence being synchronized in parallel and to the thusly generated data packets being simultaneously routed to respective network interface modules.

In the context of the disclosure, the "sequence synchronized in parallel" means that for each data packet, the sequence is triggered at the same starting time, performed in the same timeframe, therefore also ends at the same ending time.

The "starting time", "timeframe" and "ending time" may refer to ticks of one or more clocks that may be used, in an exemplary embodiment, to synchronize the sequence in parallel for each data packet.

Typically, a static message template may comprise at least one order type field specific to a given type of order message and at least one blank field, associated to said at least one order type field, such that, if the at least one blank field is filled with replacement contents, the association of the at least one order type field and of the at least one blank field forms an order entry message of said given type.

Of course, the static message template may comprise a plurality of such associations of at least one order type field and of at least one blank field to be processed in order to form a plurality of order entry messages, each of a given type.

The order types of the order entry messages may correspond to any type of order messages known in the field of exchange. Simple examples of types of order messages include market orders which are either orders to buy or sell financial securities at current market prices and limit orders which are orders to buy securities at no more than a given price or to sell at no less than a specific price. Other examples of types of order messages include various types of complex and/or conditional orders.

Typically, a template processing instructions dataset may comprise instructions to fill at least one blank field of a static message template with replacement contents. A typical example of replacement content may be specific to a financial instrument. Other possible examples of replacement content are a desired price and/or a desired quantity.

In an embodiment, the method further comprises, prior to simultaneously generating each data packet of the plurality of data packets, obtaining a trading signal; processing the trading signal using a trading strategy algorithm module to generate a trigger request; and decoding the trigger request to obtain the content request data for said order entry message.

A trading signal may comprise one or more of a market data update, a news feed update, an execution notification from a private feed or a more complex trading signal coming from the customer's trading application.

Market data updates and news feed updates are updates which are broadcast to all market participants while private feed typically correspond to private TCP messages sent to single market participants.

A market data update typically corresponds to an updated price of one or more financial securities, or to an updated absolute or relative price variation across a given time period of one or more financial securities.

Therefore, as soon as the market data update is obtained, it is possible, in a minimum timeframe, to generate and transmit order entry messages which are optimized according to a predefined trading strategy applied to the obtained market data update. This combination of time optimization and intelligent order entry message generation provides a competitive advantage.

In an embodiment, the template processing instructions type memory update data packets comprise content to be added to an updated static message template and instructions for processing the updated static message template to add said content; updating the template processing instruction datasets is based on said content and on said instructions; and processing the selected updated static message template based on the selected updated template processing instruction dataset to generate the data packet comprises adding said content to said selected updated static message template according to said instructions.

Particular advantages of including both the content to be added and the instructions for processing to add said content in the same dataset are minimizing the number of required memory accesses to generate the data packet, and preventing the need for cache storing and subsequent cache reading the selected updated template processing instruction dataset.

Indeed, it is possible to simultaneously read the selected updated template processing instruction dataset in a main memory and process the selected updated static message template to generate the data packet on a byte-per-byte basis.

In an embodiment, the selected updated directory entry comprises at least a first datablock address, a first datablock length, a second datablock address, and a second datablock length; selecting the updated static message template comprises reading, in a first memory, a first datablock having a length corresponding to the first datablock length, starting from an address corresponding to the first datablock address; selecting the updated template processing instruction dataset comprises reading, in a second memory, a second datablock having a length corresponding to the second datablock length, starting from an address corresponding to the second datablock address; and processing the selected updated static message template based on the selected updated template processing instruction dataset to generate the data packet comprises processing said first datablock based on said second datablock.

A particular advantage of selecting each dataset based on a length and an address in, respectively, the first memory and the second memory, is that only one access to the first memory and one access to the second memory are required in order to generate the data packet.

Moreover, processing said first datablock based on said second datablock prevents the need for cache storing, then cache reading, the first datablock and the second datablock. As an example, the data packet may be generated in real time on a byte-per-byte basis at the same time as the first datablock is read in the first memory and the second datablock is read in the second memory.

In an embodiment, the memory update data packets further comprise metadata type memory update data packets, and the method further comprises for each metadata type memory update data packet, updating a metadata record based on the metadata type memory update data packet. In this embodiment, the synchronized sequence further comprises, for the selected updated directory entry, selecting a metadata record based on the selected updated directory entry, and processing the selected updated static message template to generate the data packet being further based on the selected metadata record.

The metadata record contains information which may be appended to the order entry messages and which may be useful for processing the generated data packet by one or more modules further downstream.

Storing the metadata records separately allows a simultaneous access to a metadata record, a static message template dataset and a template processing instructions dataset, resulting in a significant improvement of the overall latency.

In an embodiment, each updated directory entry comprises at least a datablock index value; selecting the metadata record comprises reading, in a third memory, a third datablock at an address corresponding to the datablock index value; and processing the selected updated static message template to generate the data packet comprises processing the generated data packet to include the third datablock.

Processing the generated data packet to include the third datablock may typically be performed by writing the contents of the third datablock at a specified position in the selected updated static message template, for example based on instructions in the template processing instructions.

In an embodiment, the content request data for said order entry message further comprises forwarded content data to be included in the data packet and the method further comprises further processing the generated data packet to include the forwarded content data.

Typically, the forwarded content data may relate to data such as a price and/or a number of financial securities. The forwarded content data may be generated by the trading strategy algorithm module according to an implemented trading strategy.

Providing forwarded content data as part of the content request data instead of as part of an updated template processing instructions dataset allows updating a minimum number of template processing instructions datasets. Therefore, the time necessary to update the template processing instructions datasets is kept to a minimum. Moreover, keeping to a minimum the number of updated template processing instructions datasets stored in a main memory allows for a quick selection of a given updated template processing instructions dataset in said main memory.

In an embodiment, each updated directory entry comprises an arm flag, and the method further comprises, prior to obtaining the content request data:
    checking each updated directory entry to determine whether the data packet that would be generated by selecting at least one updated static message template and at least one updated template processing instruction dataset based on said updated directory entry, and processing the selected updated static message template based on the selected updated template processing instruction dataset to generate the data packet, is non-corrupted,
    if said data packet that would be generated is non-corrupted, enabling the arm flag of said updated directory entry, and
    if said data packet that would be generated is corrupted, disabling the arm flag of said updated directory entry.

Here, said arm flag has the function of a security check preventing corrupted data packets to be transmitted across the communication network.

In an embodiment, if said arm flag for the updated directory entry is enabled, at least an updated static message template and at least an updated template processing instruction dataset are selected based on the selected updated directory entry, and the selected updated static message template is processed based on the selected updated template processing instruction dataset to generate a data packet.

In an embodiment, if said arm flag for the updated directory entry is disabled, the data packet is not generated, and a value associated to the updated directory entry is transmitted.

The transmitted value associated to the updated directory entry has the function of an indication that the updated directory entry may not be used for generating data packets because such data packets would be corrupted. Based on this indication, it is possible to determine new memory update data packets, and to update directory entries of the directory, static message templates and/or template processing instruction datasets based on said new memory update data packets.

In an embodiment, prior to obtaining the content request data, each updated directory entry comprises an enabled arm flag and a reissue flag, upon processing the selected updated static message template to generate the data packet, enablement of the reissue flag for the selected updated directory entry is checked, and the method further comprises, if the reissue flag is disabled, disabling the arm flag, and if the reissue flag is enabled, maintaining the arm flag enabled.

In other words, the reissue flag, if disabled, has the function of disabling the arm flag. The arm flag in a given updated directory entry may therefore have the function of a readable indicator. Indeed, knowledge that the arm flag is disabled implies that a data packet has been generated based on said given updated directory entry and that the reissue flag is disabled.

In an embodiment, the method further comprises: obtaining a subsequent content request data for said order entry message, comprising a request index, selecting a subsequent updated directory entry based on the request index, and checking enablement of the arm flag for the subsequent updated directory entry.

Then, if said arm flag for the subsequent updated directory entry is enabled, at least a subsequent updated static message template and at least a subsequent updated template processing instruction dataset are selected based on the selected subsequent updated directory entry, and the selected subsequent updated static message template is processed based on the selected subsequent updated template processing instruction dataset to generate a subsequent data packet.

If said arm flag for the subsequent updated directory entry is disabled, the subsequent data packet is not generated, and a value associated to the subsequent updated directory entry is transmitted.

Said value associated to the subsequent updated directory entry may for example be transmitted to the trading strategy algorithm module. The trading strategy algorithm module may be configured to deduce based on this value that all subsequent content request data comprising a subsequent request index corresponding to said given directory entry will be rejected. The trading strategy algorithm may be further configured to take into account this information to adapt the trading strategy.

In this embodiment, the arm flag in a given updated directory entry has the dual function of:
a selector which upon receiving a subsequent trigger request may allow or reject a subsequent trigger request, and
an indicator, which upon rejecting a subsequent trigger request, transmits a value associated to said given directory entry.

In addition, the reissue flag has the function of commanding the arm flag upon generating a data packet to either allow or reject subsequent trigger requests.

In an embodiment, the synchronized sequence further comprises computing a checksum of the generated data packet and further processing the generated data packet to insert the computed checksum.

A checksum is a small-sized datum derived from the generated data packet for the purpose of detecting errors that may have been introduced during its transmission or storage. By itself, the checksum may be used to verify data integrity, for example upon reception of the generated data packet by the financial market.

A further aspect of the disclosure concerns a non-transitory computer storage medium storing instructions of a computer program wherein an execution of said instructions by a processing circuit causes an implementation of the above method.

A further aspect of the disclosure concerns a computer program comprising instructions causing an implementation of the above method, when said instructions are executed by a processing circuit.

A further aspect of the disclosure concerns a device for simultaneously generating a plurality of data packets to be transmitted across a communication network, each data packet comprising at least one order entry message forming a data payload, the device comprising a processing circuit configured for:
obtaining a plurality of memory update data packets comprising at least:
directory type memory update data packets,
static message type memory update data packets,
template processing instructions type memory update data packets,
for each directory type memory update data packet, updating a directory entry of a directory, based on said directory type memory update data packet,
for each static message type memory update data packet, updating a static message template, based on the static message type memory update data packet,
for each template processing instructions type memory update data packet, updating a template processing instruction dataset to provide guidance to process an updated static message template, based on the template processing instructions type memory update data packet,
generating simultaneously all the data packets of said plurality of data packets according to a sequence synchronized in parallel and comprising for each data packet:
obtaining content request data for said order entry message, comprising a request index,
selecting an updated directory entry based on the request index,
for the selected updated directory entry, selecting at least one updated static message template and at least one updated template processing instruction dataset based on the selected updated directory entry,
for the selected updated directory entry, processing the selected updated static message template based on the selected updated template processing instruction dataset to generate the data packet,
routing simultaneously the thusly generated data packets to respective network interface modules for transmitting simultaneously the plurality of generated data packets across the communication network.

In an embodiment, the processing circuit comprises:
at least one clock;
a plurality of groups of interconnected logic blocks;
each group of said plurality of groups of interconnected logic blocks being configured for generating one of the data packets of said plurality of data packets according to said sequence;
said plurality of groups of interconnected logic blocks being simultaneously synchronized by said clock for synchronizing said sequence in parallel.

A particular advantage is that the at least one clock synchronizes said sequence in parallel. For example, the sequence may comprise a predefined number of N basic operations. The processing circuit may be configured such that at a given tick of the at least one clock, each group of interconnected logic blocks is controlled to execute one basic operation of said sequence, such that each basic operation of said sequence is performed simultaneously by each group of interconnected logic blocks in order to generate the plurality of data packets in a predefined timeframe, corresponding for example to N ticks of the at least one clock.

In an embodiment, the processing circuit comprises:
a plurality of order entry engines, each order entry engine being configured for generating one of the data packets of said plurality of data packets according to said sequence;
each order entry engine of the plurality of order entry engines comprising:
a request decoder module for obtaining content request data for said order entry message, comprising a request index,
a storage and serialization module for:
selecting an updated directory entry based on the request index,
selecting, for the selected updated directory entry, at least one updated static message template and at least one updated template processing instruction dataset based on the selected updated directory entry, a template processing module for processing, for the selected updated directory entry, the selected updated static message template based on the selected updated template processing instruction dataset to generate the data packet, a network protocol module for routing the thusly generated data packet to a network interface module.

BRIEF DESCRIPTION OF THE DRAWINGS

The present disclosure is illustrated by way of example, and not by way of limitations, in the figures of the accompanying drawings, in which like reference numerals refer to similar elements and in which:

FIG. 19 illustrates an example of a generated data packet according to an embodiment;

DETAILED DESCRIPTION

Figure 1:
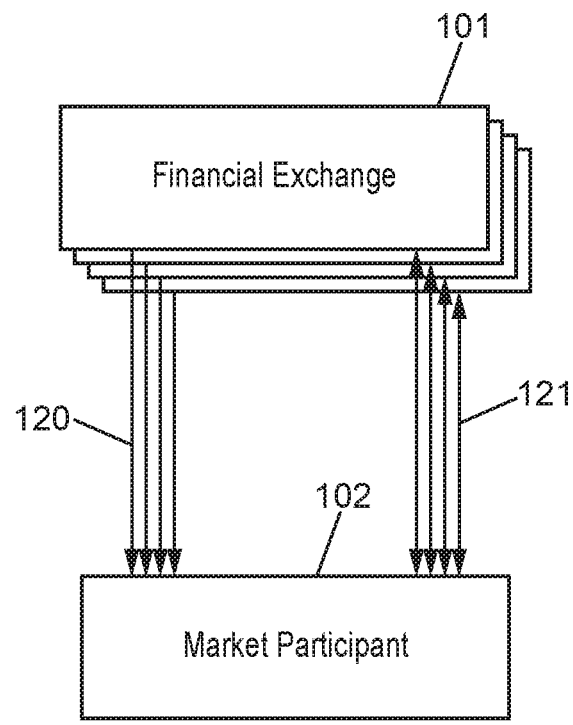
FIGS. 1 and 3 illustrate an example of data exchange between a financial exchange and a market participant.
Figure 2:
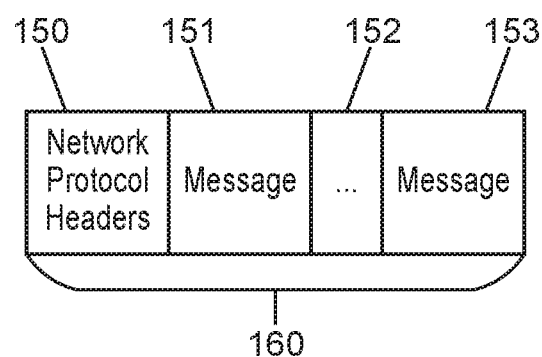
FIG. 2 designates an example of a protocol data unit which may be used for said data exchange.
Figure 3:
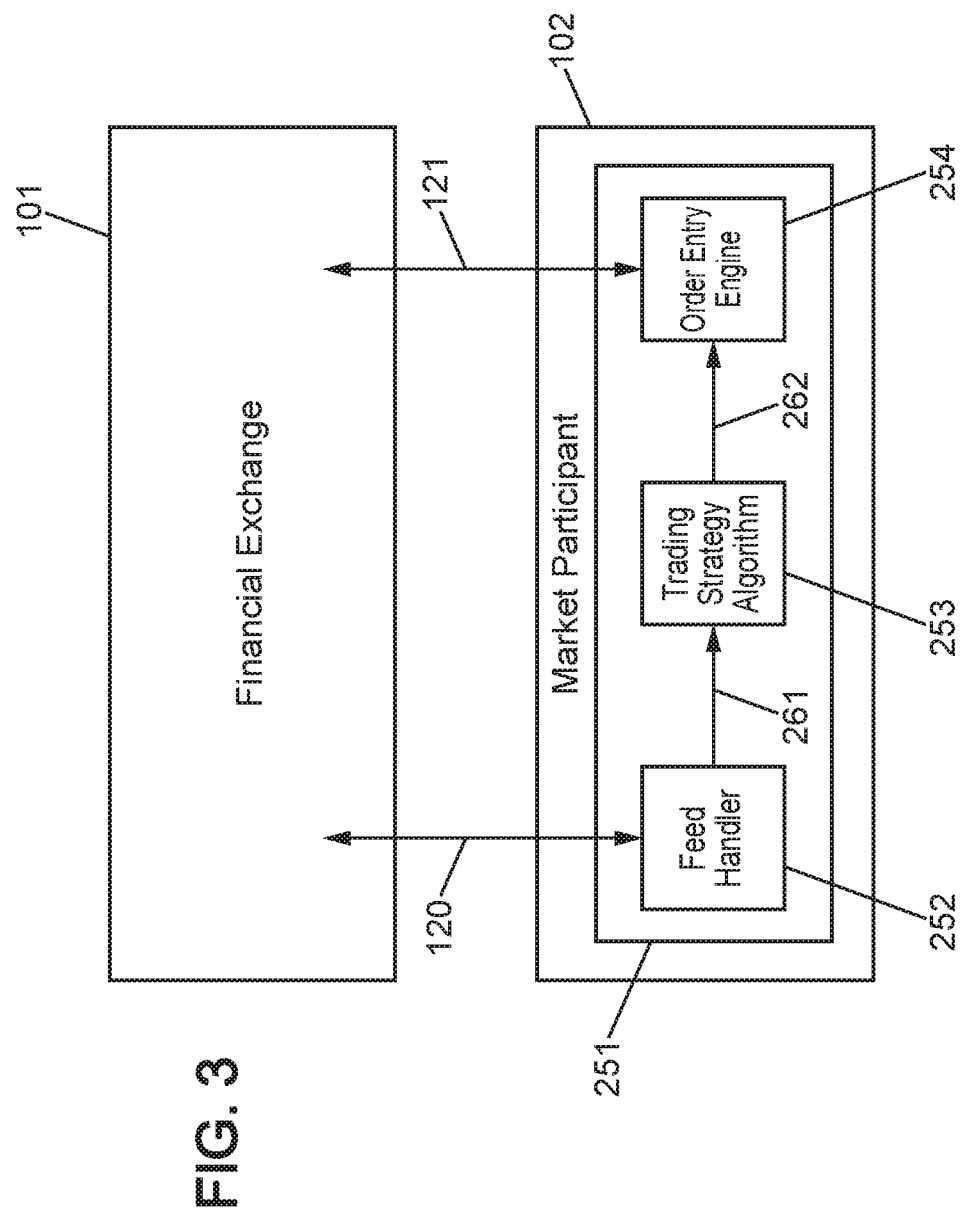
Figure 4:
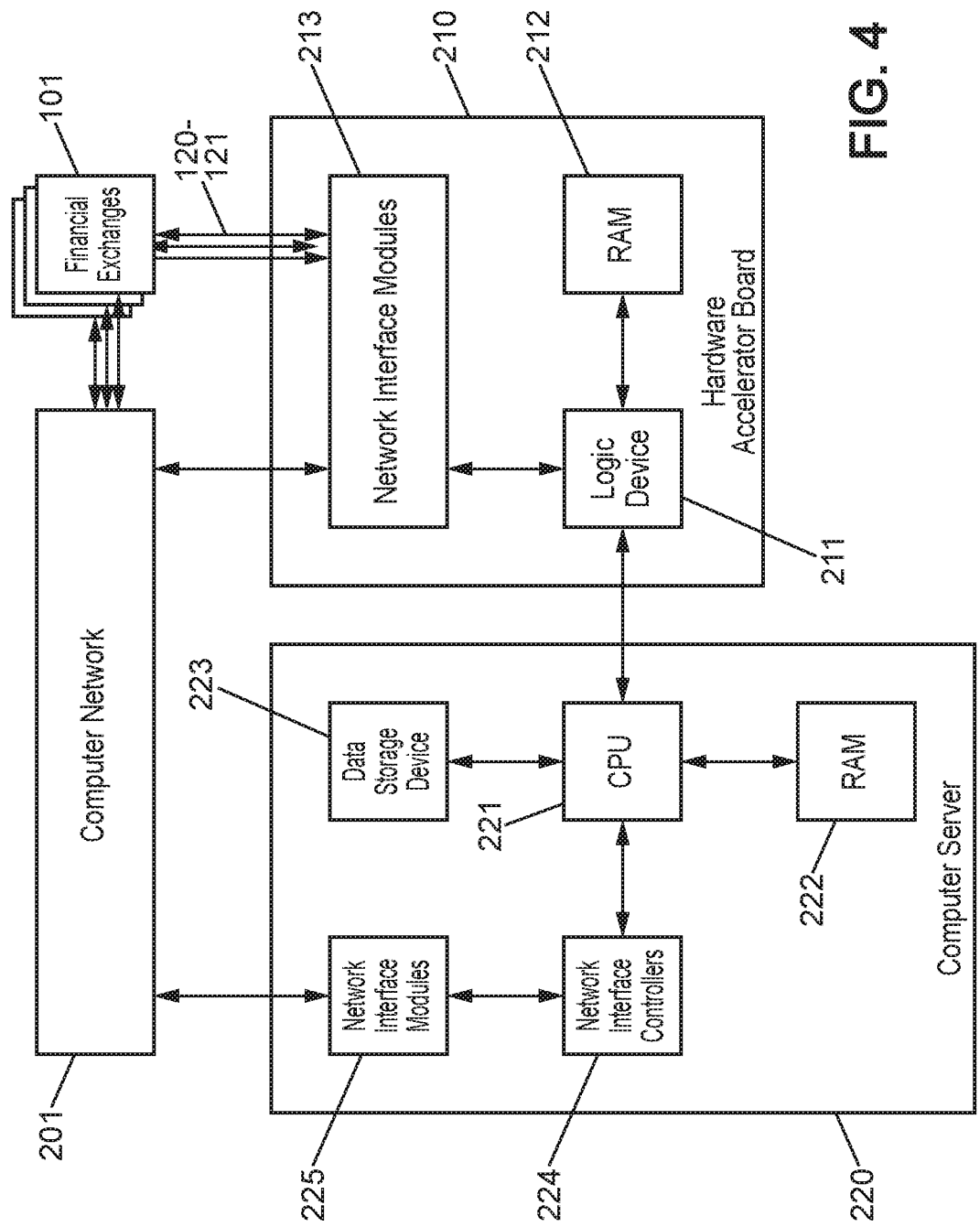
FIGS. 4 and 5 illustrate an example of an implementation of hardware acceleration to a computer server of a market participant for exchanging data with a financial exchange.
Figure 5:
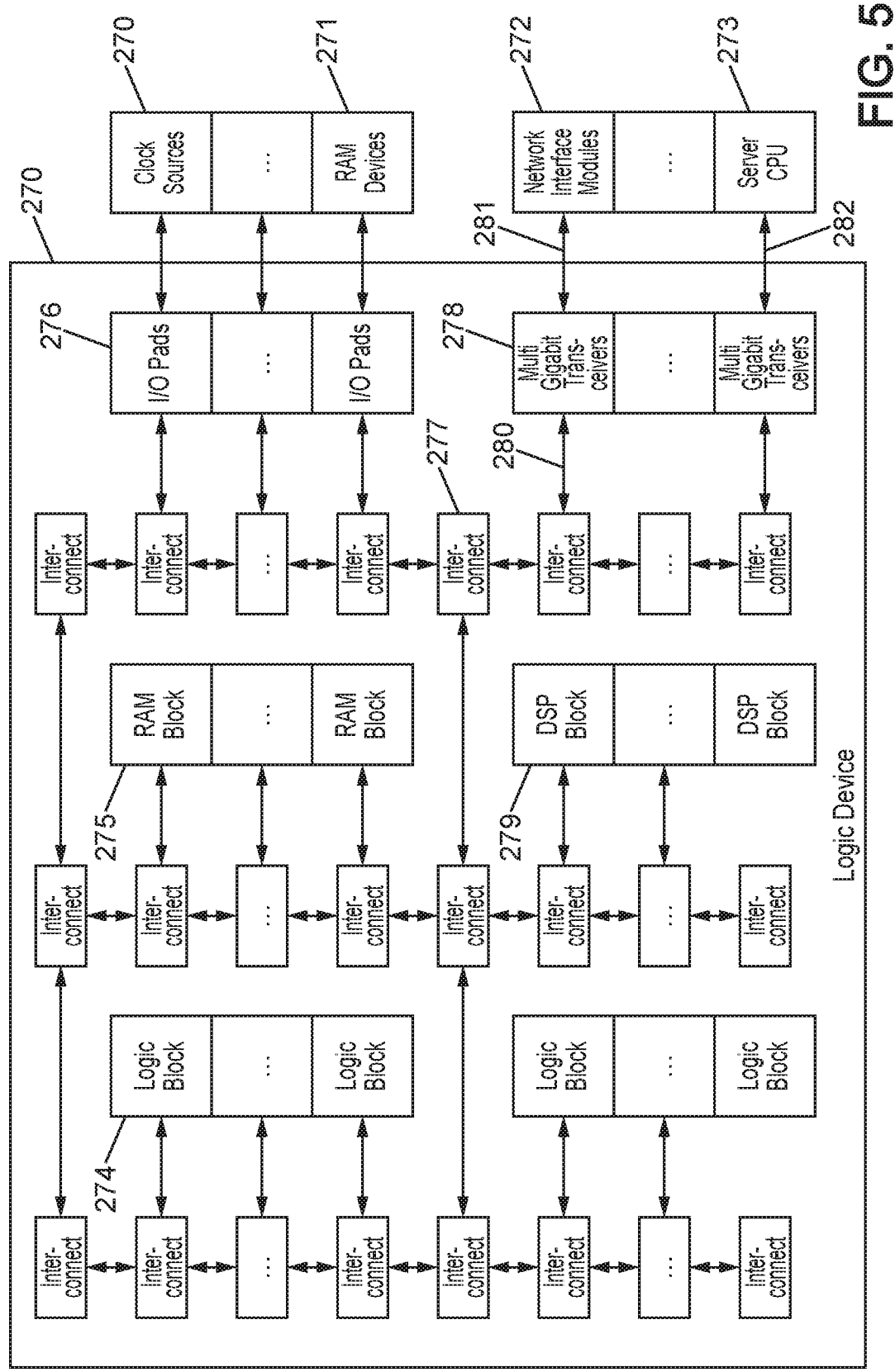

The present disclosure reduces the latency of trading systems by using an innovative implementation of an order entry engine logic module 254, which improves the state of the art on two fronts (1) reducing the number of steps involved on the critical path, and (2) implementing data updates on-the-fly rather than in-memory. These two improvements combined provide (1) a lower overall latency; (2) a lower latency jitter, with a predictable ceiling value which representing the worst case, and lower variance in the latency values distribution; (3) higher throughput, preserving low latency figures even during cases with a sustained high message rate; (4) easier support of new financial exchanges with a different order entry message specification, by making the Order Entry logic module 311 agnostic with regard to the order entry message protocol and (5) facilitates the development of the Trading Strategy Algorithm logic module 253 by decreasing its complexity and improves its latency in providing a simple request interface 262.

Figure 6:
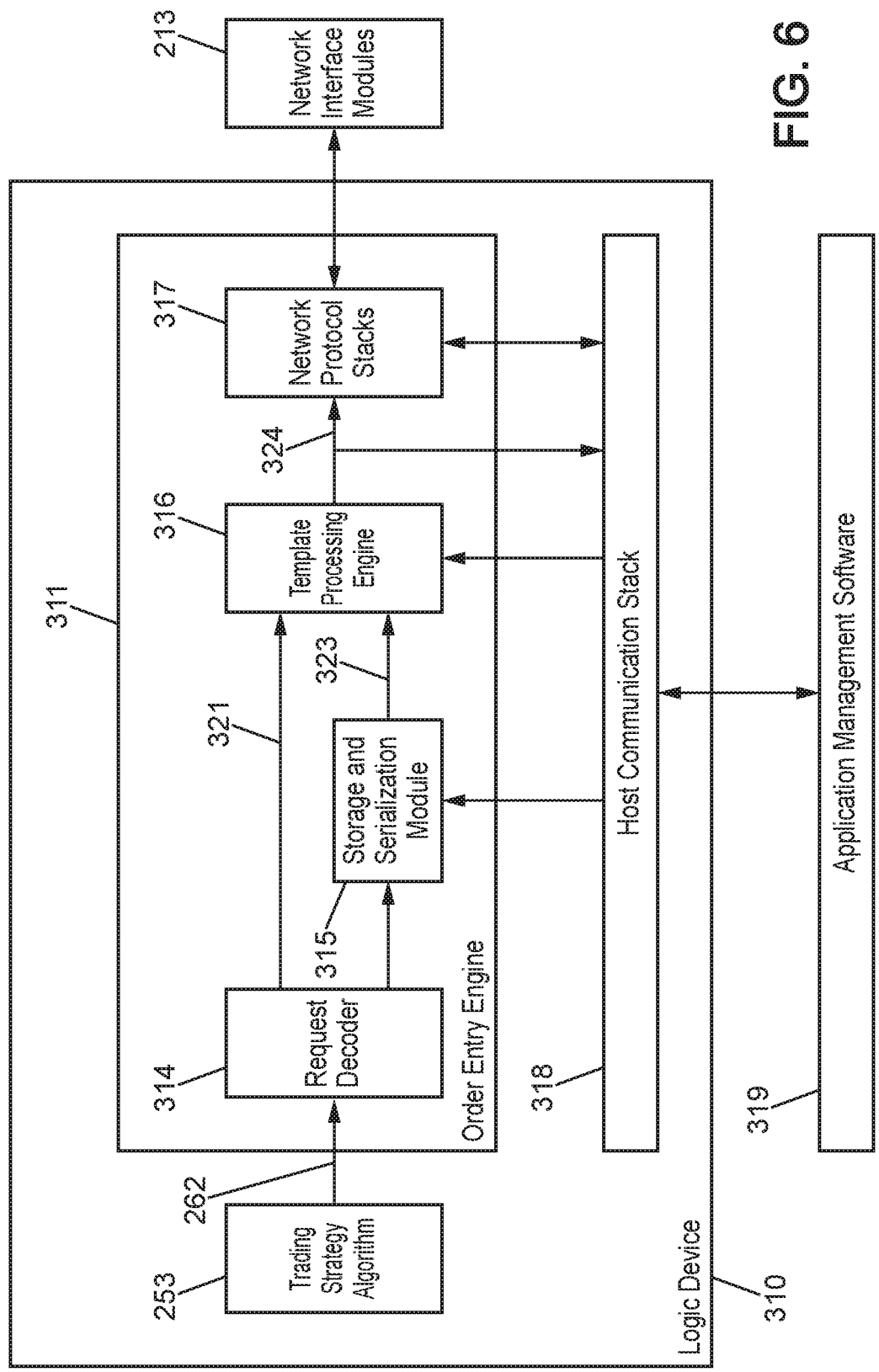
FIG. 6 designates an example of a processing circuit according to an embodiment.
Figure 21:
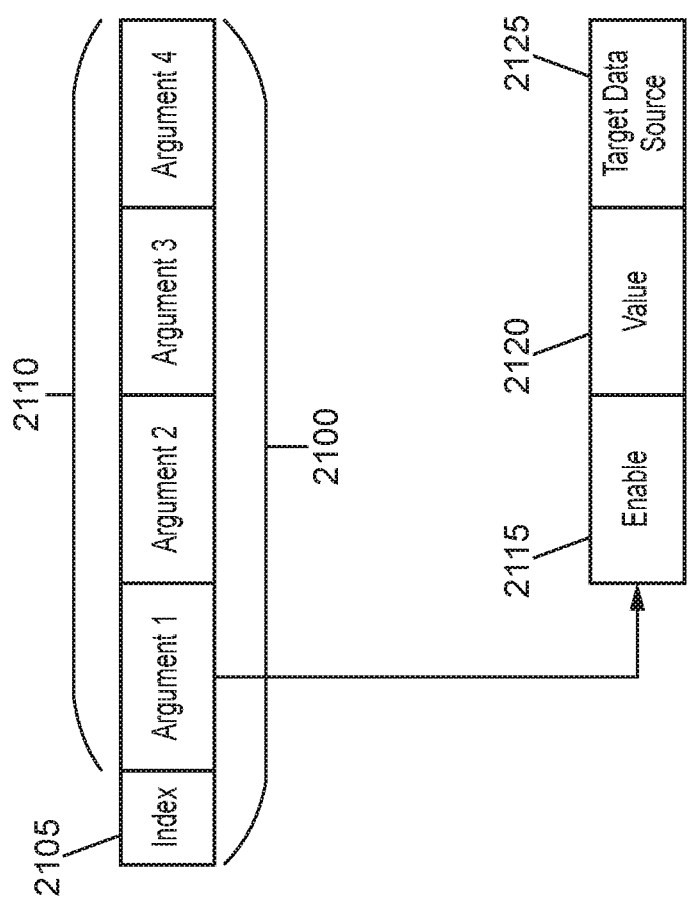
FIG. 21 designates a block diagram of a general algorithm for handling content request data according to an embodiment.

It is now referred, in an exemplary embodiment, to FIGS. 6 and 21.

An order entry logic module or order entry engine 311 is implemented as a pipeline comprising:

(1) a Storage and Serialization logic module 315 storing three data sets and serializing them in three packets 323, (2) a Template Processing Engine module 316 processing these data sets 323 and transforming them into a valid packet 324 containing one or more order entry message packets; and (3) a Network Protocol Stacks module 317 routing these message packets to one of the several multiple network stacks spanning over multiple network interface modules 213.

The Storage and Serialization logic module 315 receives, from (1) a Request Decoder logic module 314, request data 2100 containing the requested index 2105 along with optional arguments 2110; and (2) a Host Communication Stack 318, data packets containing memory update instructions and content generated by an application management software 319, and transmits to a Template Processing Engine logic module 316 located downstream of three data streaming buses, data packets containing respectively (1) a static template message with none; one or more segments of bytes filled with blank values; (2) a list of instructions providing guidance to process the static message template; and (3) a metadata record containing information required for the processing by modules further downstream.

Figure 7:
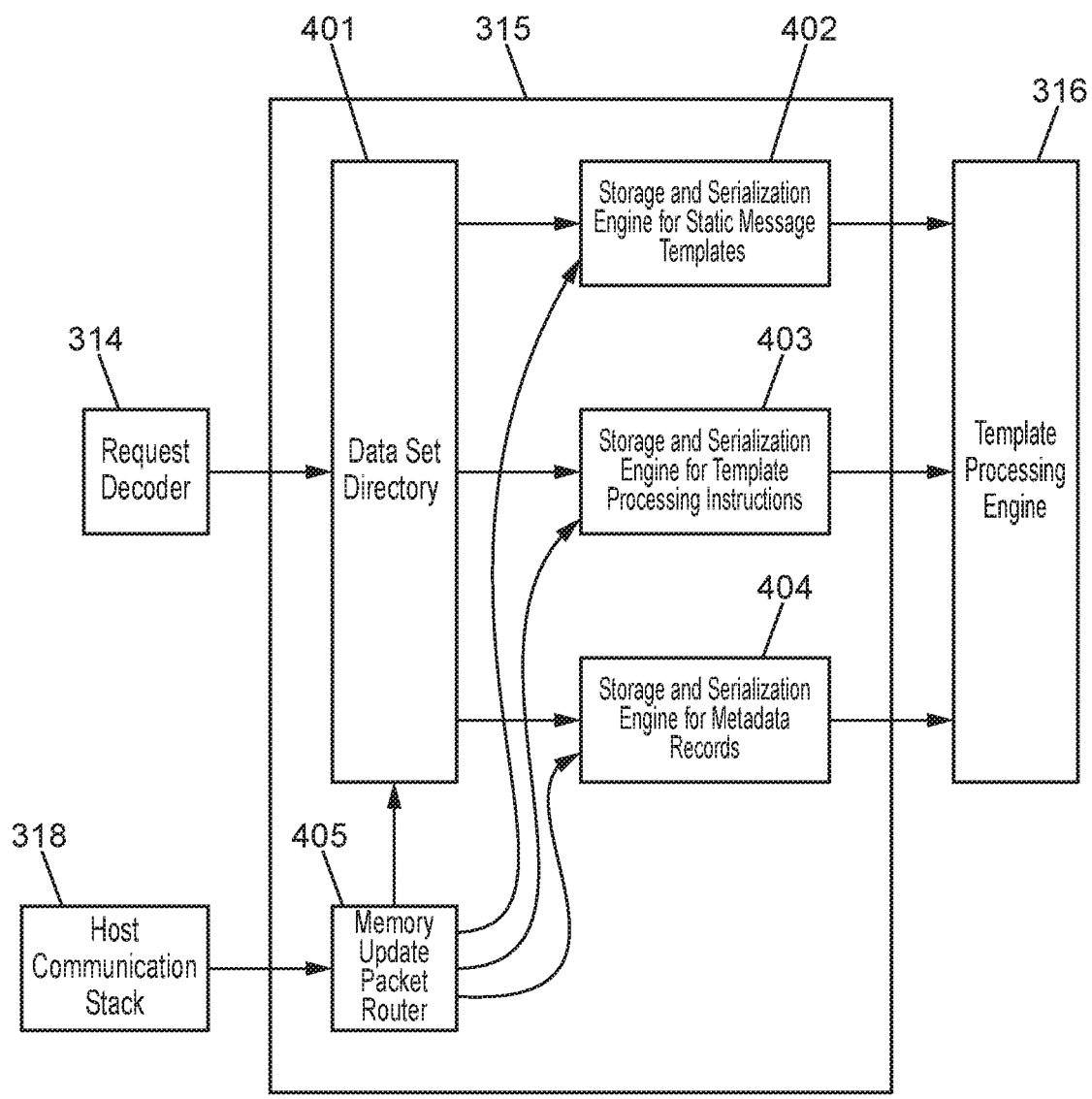
FIG. 7 designates an example of a storage and serialization logic module according to an embodiment.
Figure 20:
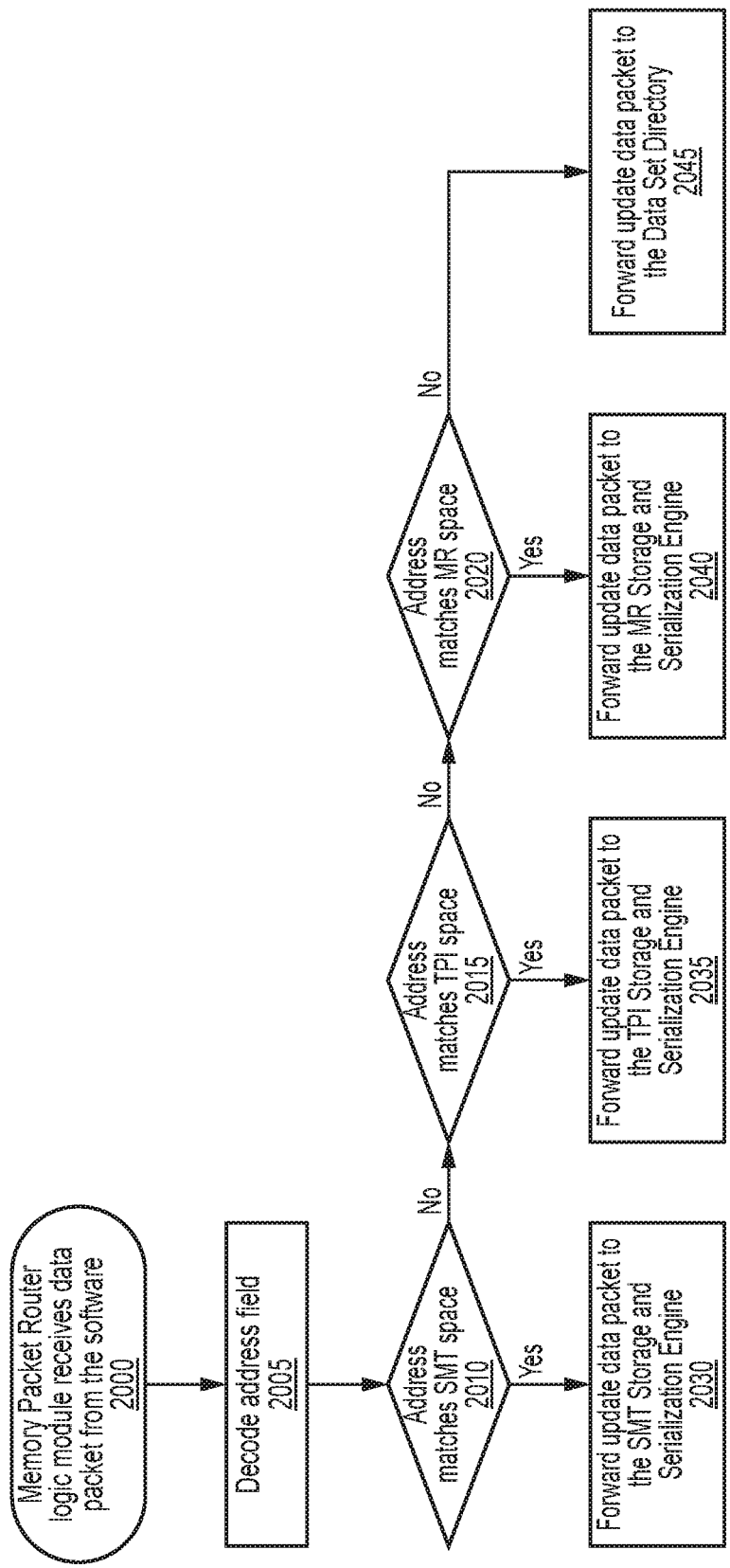
FIG. 20 designates a block diagram of a general algorithm for handling memory update data packets according to an embodiment.

With reference to FIGS. 7 and 20, the logic module 315 may contain a Data Set Directory logic module 401; three Storage and Serialization Engine logic modules 402-403-404; and a Memory Update Packet Router logic module 405 which decodes content update packets generated by the application management software 319. Off the three storage and serialization modules, one module 402 handles static messages templates contents; one module 403 handle template processing instructions; and one module 404 handle metadata records.

The Request Decoder logic module 314 may generate content requests which contain an index. These requests are handled by a Data Set Directory logic module 401, which reads and decodes the directory entry matching the requested index. This directory entry contains (1) an address and length transmitted to the storage and serialization engine containing static message template contents 402; (2) an address and length transmitted to the storage and serialization engine containing template processing instructions contents 403; and (3) an index transmitted to the storage and serialization engine containing metadata records contents 404.

The Memory Update Packet Router logic module 405 may receive from a Host Communication Stack logic module 318 memory update data contained in data packets 2000, and decode an address field 2005 contained in the data packets 2000.

Based on the decoded address field, the Memory Update Packet Router logic module 405 may determine whether the address field matches a static message template space 2010, a template processing instruction space 2015, a metadata record space 2020, or none of the preceding.

Then, based on the determination above, the Memory Update Packet Router logic module 405 may transmit to (1) the Data Set Directory logic module 401 data 2045 to be written to specified directory entry; (2) the Storage and Serialization logic module containing static message templates 402 as data 2030 to be written to specified memory range; (3) the Storage and Serialization logic module containing template processing instructions 403 as data 2035 to be written to specified memory range; and (4) a Storage and Serialization logic module containing metadata records 404 as data 2040 to be written to specified metadata record.

Figure 8:
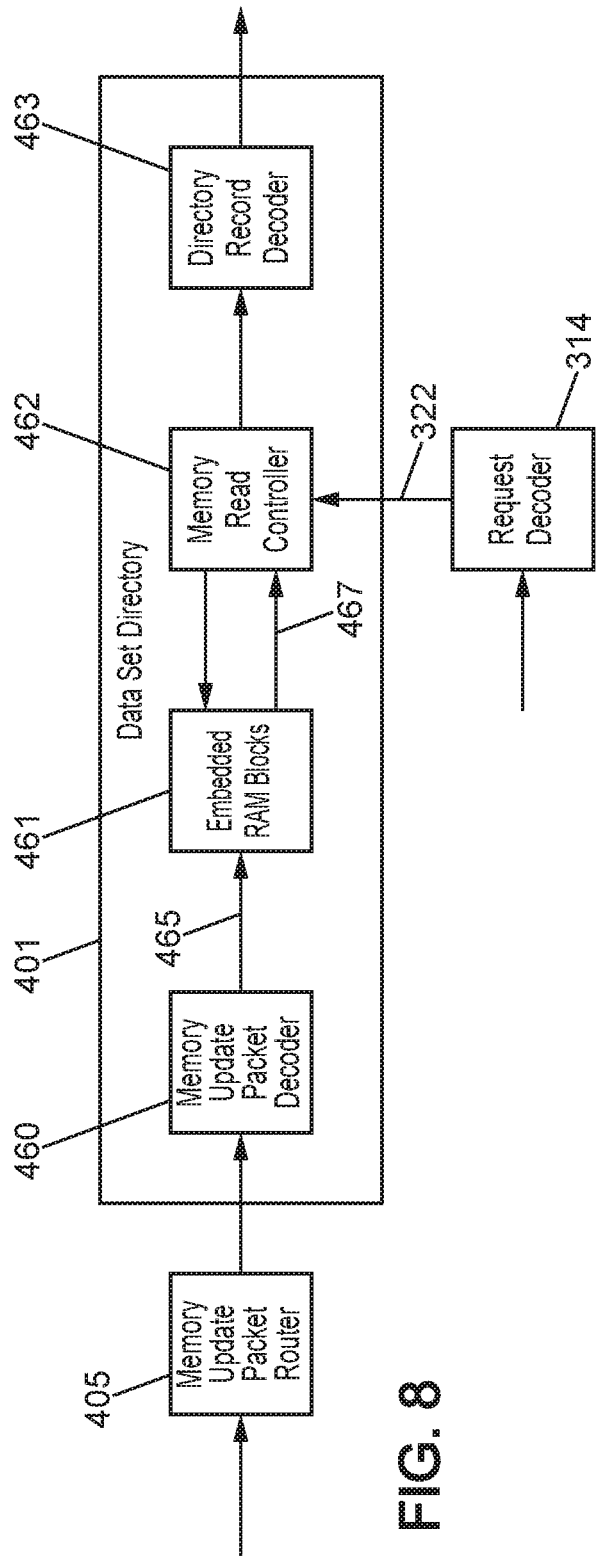
FIG. 8 designates an example of a data set directory logic module according to an embodiment.
Figure 10:
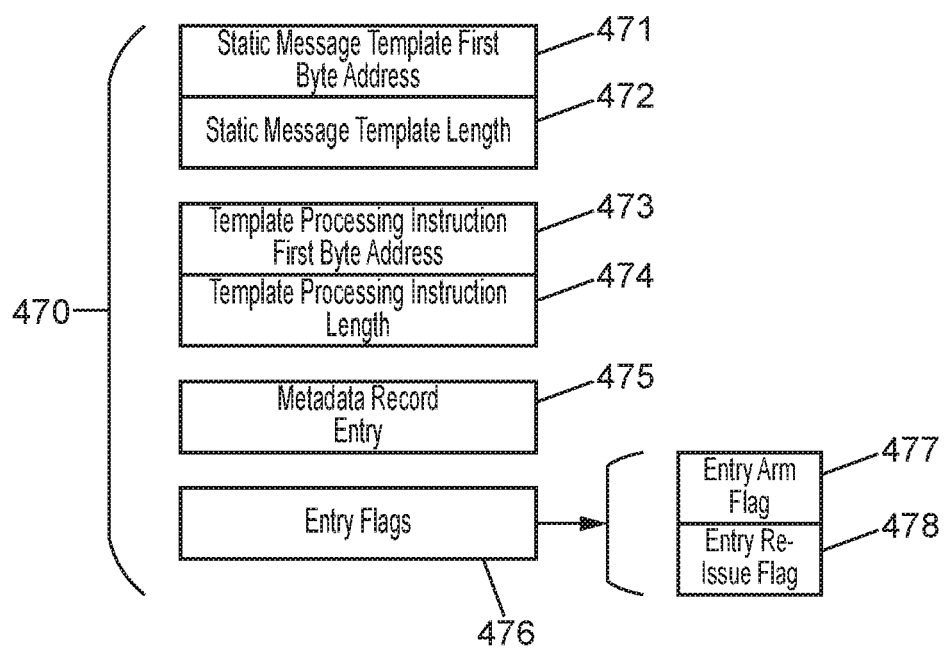
FIG. 10 designates an example of information stored as a data word in a data set directory according to an embodiment.

With reference to FIGS. 8 and 10, the Data Set Directory logic module 401 may receive, from (1) a Request Decoder logic module 314, request data containing a request index; and (2) a Memory Update Packet Router logic module (405), data packets containing memory update instructions and content, and may transmit to (1) a Storage and Serialization Engine logic module 402, a set comprising of (a) a pointer 471 to the first byte of the relevant static message template, and (b) a length 472 matching the relevant static message template; to (2) a Storage and Serialization Engine logic module 403, a set comprising of (a) a pointer 473 to the first byte of the relevant template processing instruction list, and (b) a length 474 matching the relevant template processing instruction list; to (3) a Storage and Serialization Engine logic module 404, a set comprising of (a) an index 475 to the relevant metadata record.

The index value may be used by a Memory Read Controller logic module 462 to retrieve a data word stored at specific address in a memory 461 formed by a matrix of smaller memory blocks. The data word read back from the memory 467 is processed by a Directory Record Decoder logic module 463. This module decodes the data into a structure 470 of fields, with the contents of two fields 471-472 transmitted to the Storage and Serialization Engine containing static message templates 402, two other fields 473-474 transmitted to the Storage and Serialization Engine containing templates processing instructions 403, and the last remaining field 475 transmitted to the Storage and Serialization Engine containing metadata records 404.

The contents of the memory 461 are written using content 465 decoded by a Memory Update Packet Decoder logic module 445. This module receives a data packet 450 generated by a software program running on the server computer. This data packet is routed to the relevant logic module by packet router logic module 405.

Figure 18:
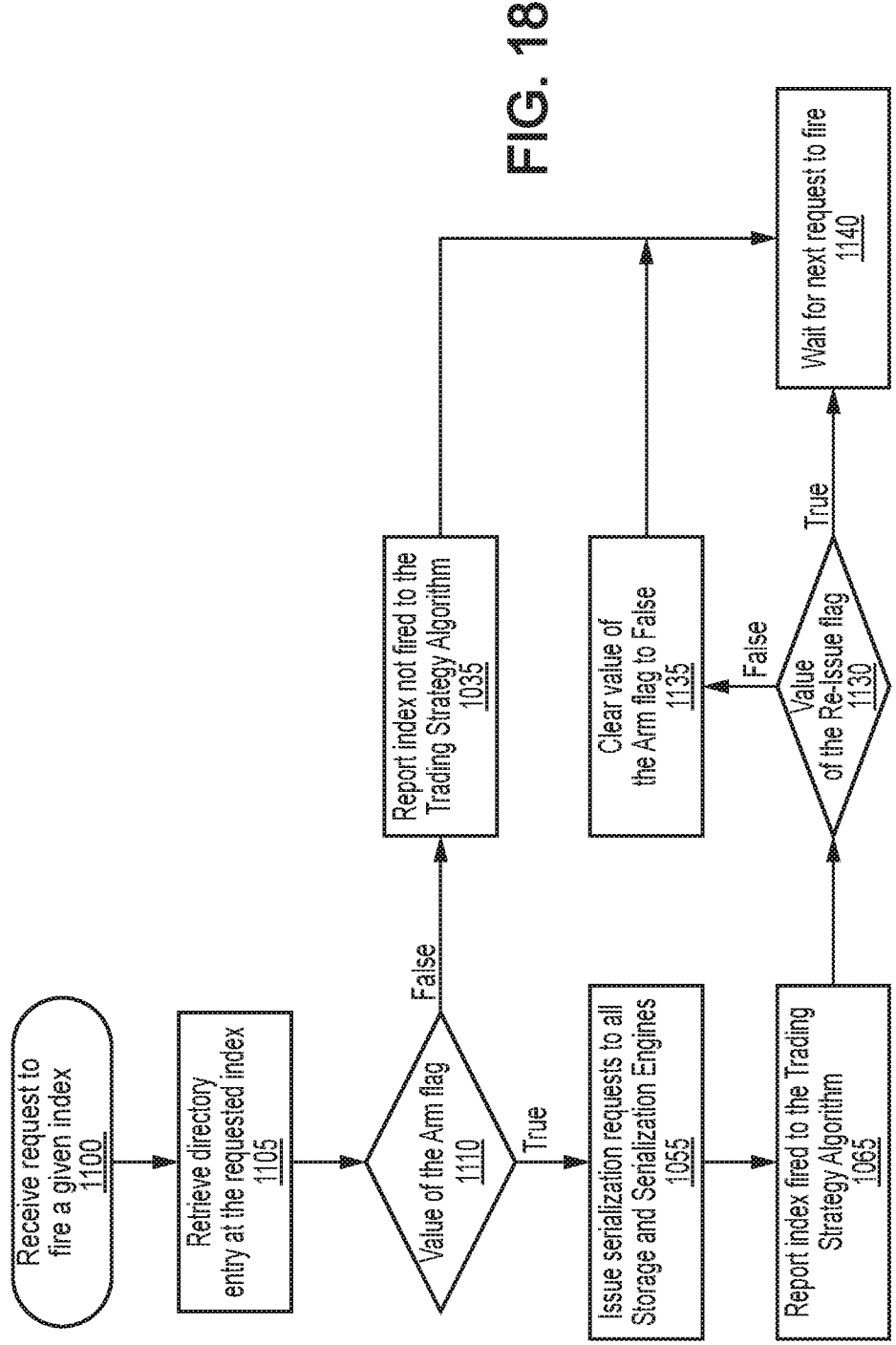
FIG. 18 designates a block diagram of a general algorithm for handling subsequent content request data according to an embodiment.

The behavior of this logic module follows a sequence of events depicted in FIG. 18. The sequence begins 1100 with the reception of a request from the Trading Strategy Algorithm logic module 253 to transmit an order entry message previously prepared and filled under the directory index transmitted along the request. The received entry index is by the Memory Read Controller logic module 462 to compute a pointer to the address in the memory 461 where the target entry resides.

Figure 17:
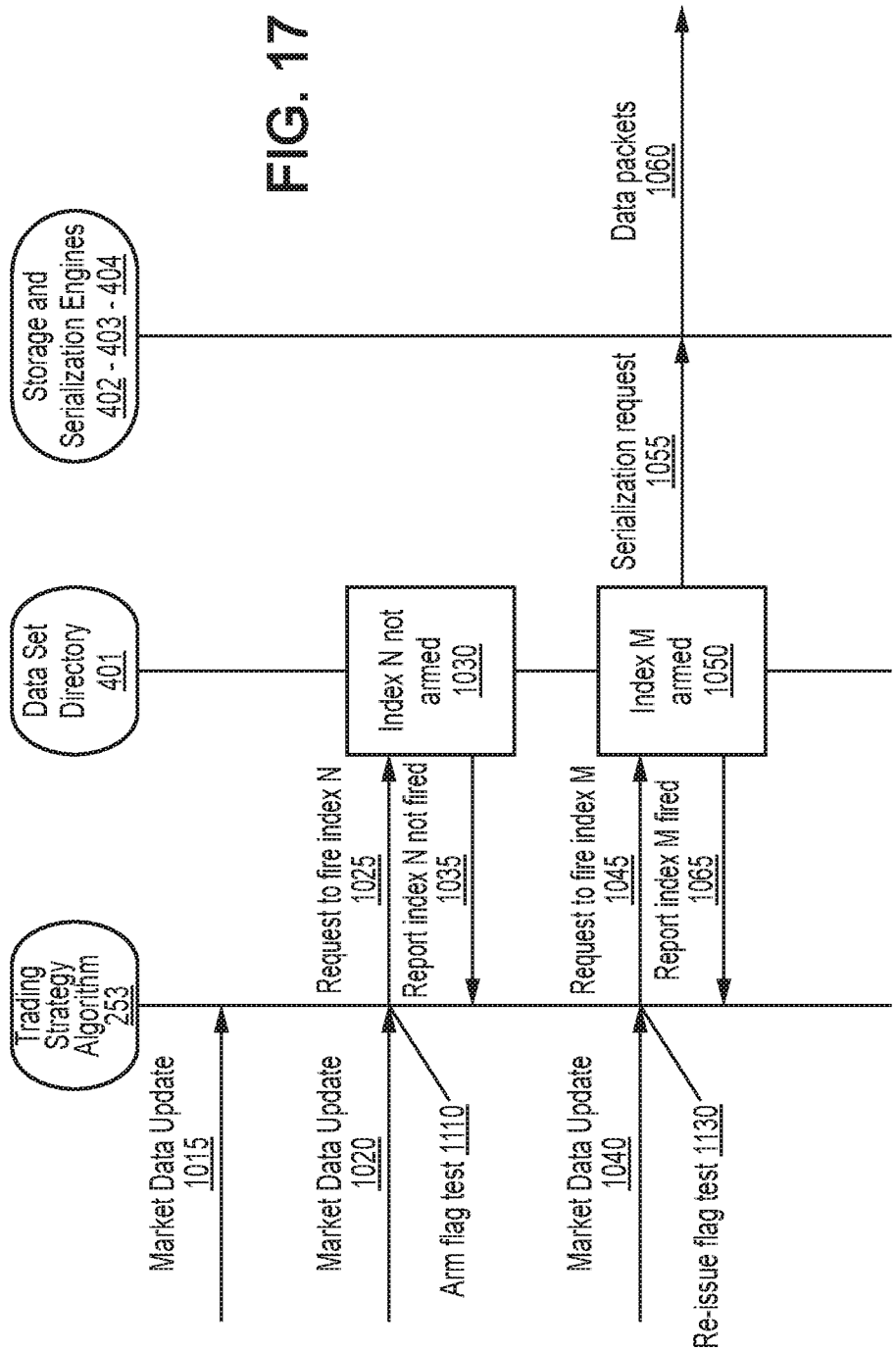
FIG. 17 designates an example of a block diagram of a general algorithm of a method for generating a plurality of data packets according to an embodiment.

With reference to FIG. 17, the contents of this entry are then retrieved 1105 and the value of the entry arm flag 477 is tested 1110. If the arm flag is disabled the requested index is not fired, and the Trading Strategy Algorithm logic module is notified 1035. On the other hand, if the arm flag is enabled than the remaining fields composing the entry 470 are decoded and their contents are forwarded 1055 to the relevant Storage and Serialization Engine logic modules 402-403-404, and the Trading Strategy Algorithm logic module is notified 1065.

The value of the Re-Issue flag 478 is tested 1130. If the re-issue flag is disabled, then the value of the arm flag is cleared to disabled 1135 to match the intent of the trading strategy which is to not transmit several times a given order entry message. Conversely, if the re-issue flag is enabled than no changes are done to the arm flag. In both cases the Data Set Directory logic module waits for next request to fire 1140.

Figure 9:
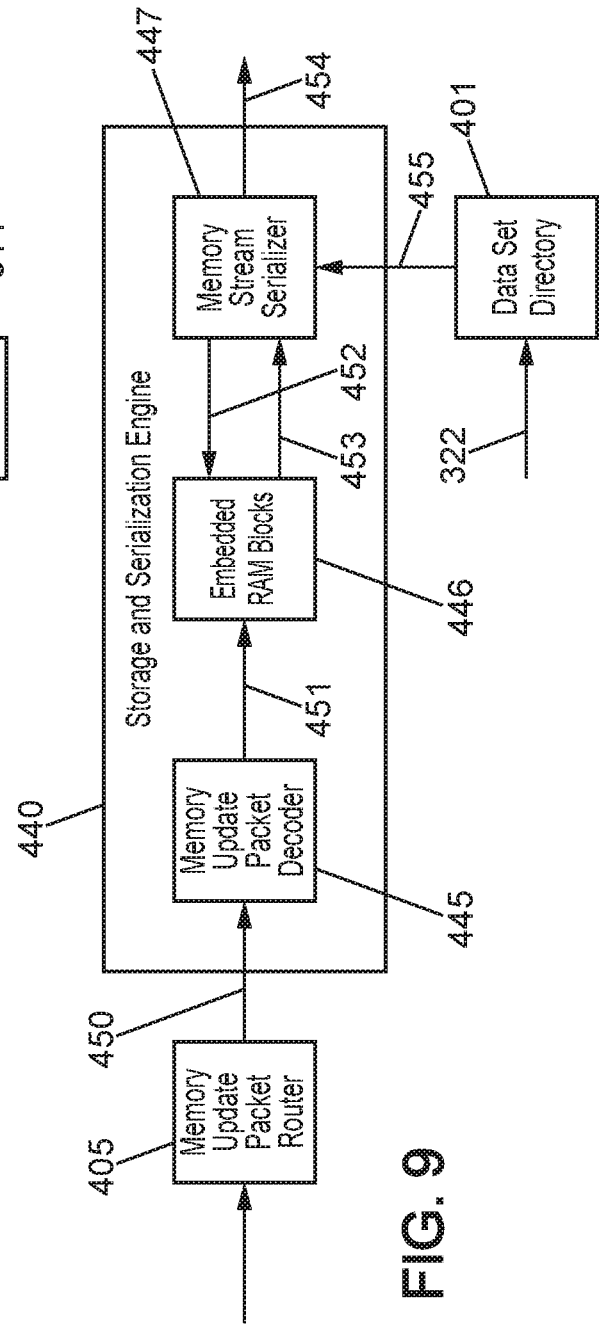
FIG. 9 designates an example of a storage and serialization engine logic module according to an embodiment.

With reference to FIG. 9, a total of three instances of a Storage and Serialization Engine logic module 402-403-404 are used. The internal implementation of these instances is identical with the exception of the size of the memory block matrix 446.

This module is able to perform read and write tasks simultaneously. A read operation is started the moment read parameters 455 is received from the Data Set Directory logic module 401. A Memory Stream Serializer logic module 447 generates a succession of read commands on a memory bus 452. Content read back from the memory is received on the opposite direction bus 453. The Memory Stream Serializer logic module stitches these contents in a contiguous packet transmitted on a data streaming bus 454.

The contents of the memory 446 are written using content 451 decoded by a Memory Update Packet Decoder logic module 445. This module receives a data packet 450 generated by a software program running on the server computer. This data packet is routed to the relevant logic module by packet router logic module 405.

The Template Processing Engine logic module 316 may convert a set of packets comprising of: one packet containing the static message template; one packet containing template processing instructions; and one packet containing the metadata record, each packet being transmitted on a different data streaming bus.

With reference to FIG. 21, optionally the Trading Strategy Algorithm may transmit one or more arguments 2110 with four arguments offering the best trade-off between practicality and logic resource usage. Each argument consisting in an enable flag 2115; the value 2120; and the target data source 2125 in the Data Buffers logic module 507 where the value 2120 is to be stored.

Figure 11:
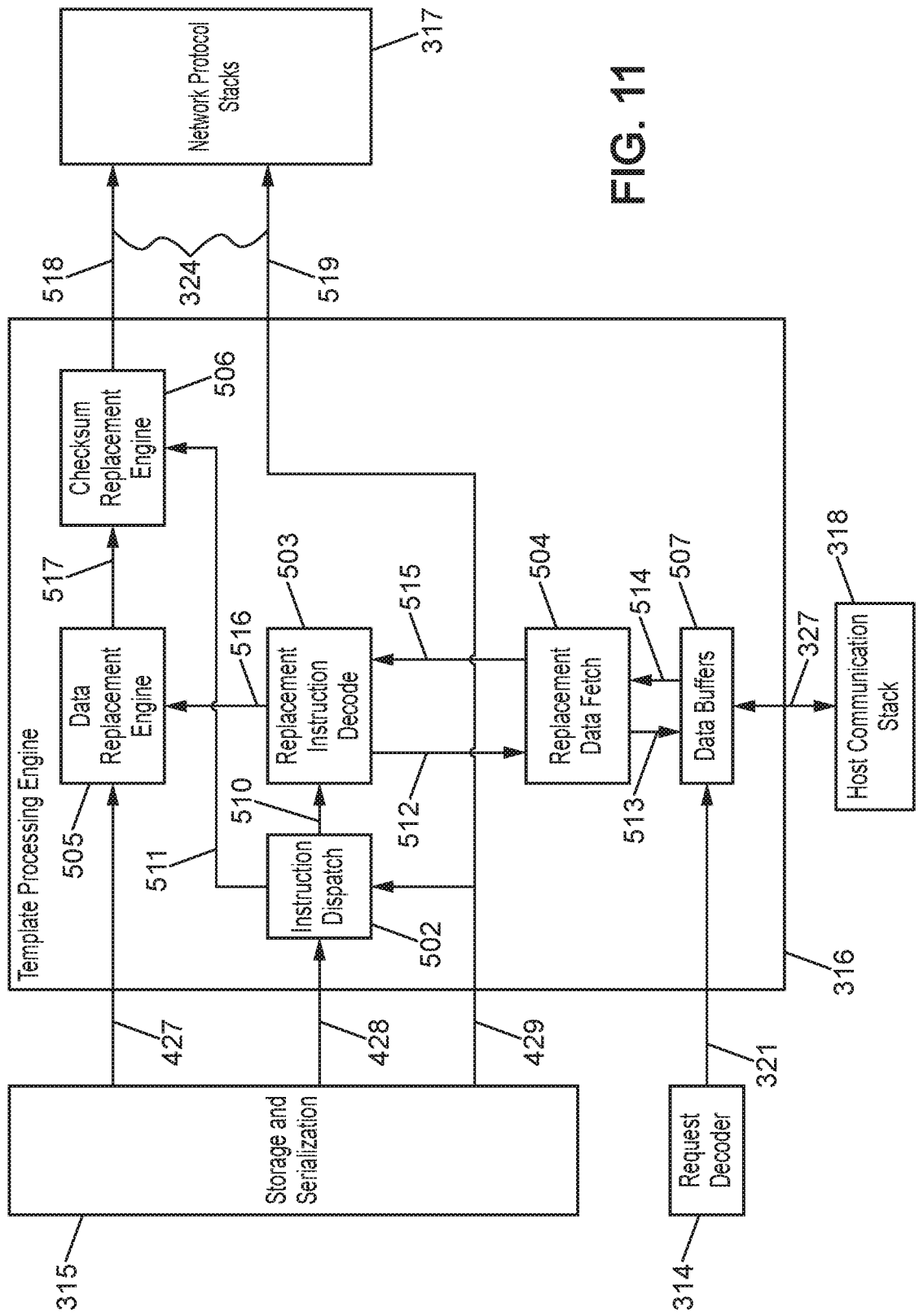
FIG. 11 designates an example of a template processing engine logic module according to an embodiment.
Figure 12:
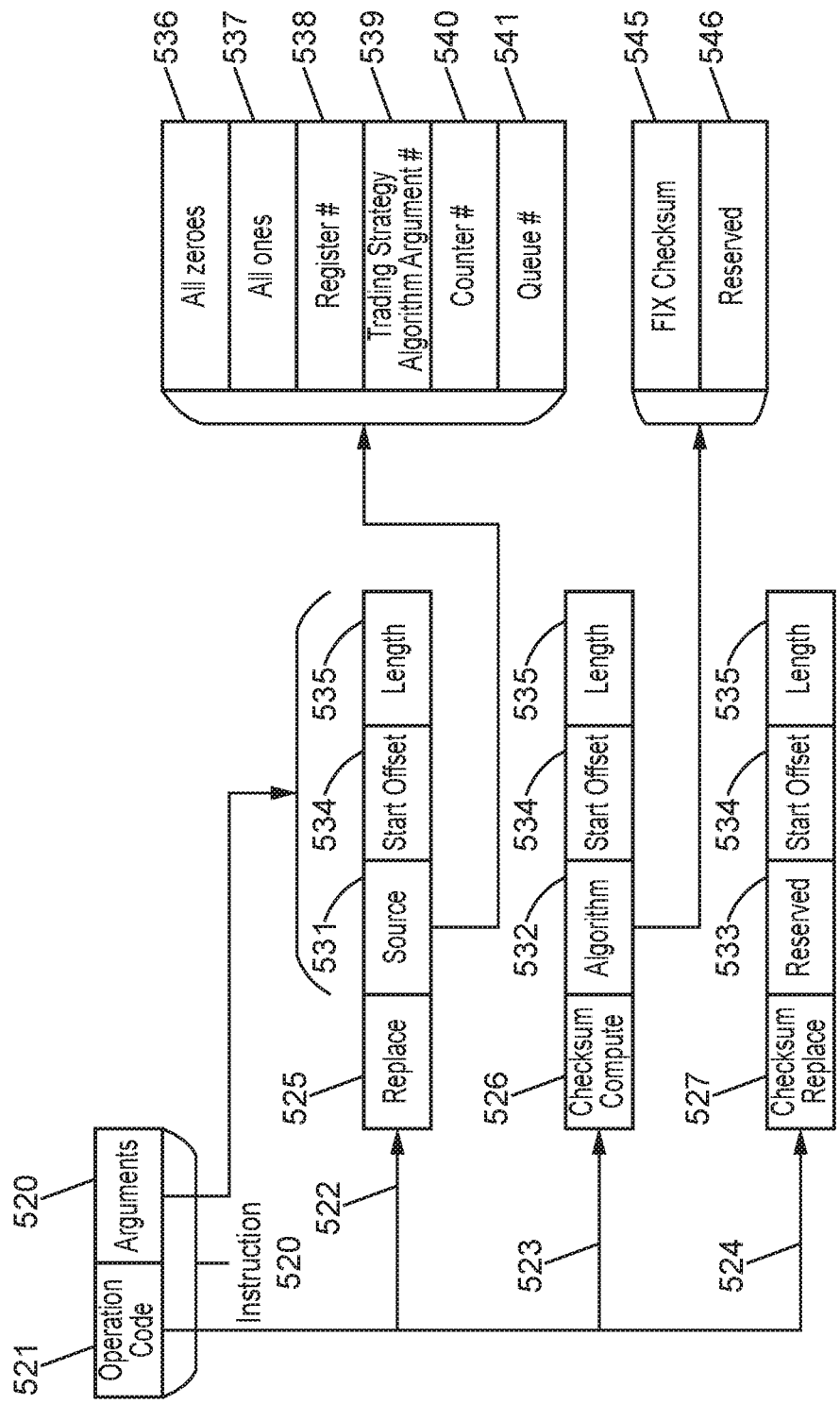
FIG. 12 designates a block diagram of a general algorithm for processing, for a selected updated directory entry, a selected updated static message template based on a selected updated template processing instruction dataset, according to an embodiment.

With reference to FIGS. 11 and 12, an Instruction Dispatch logic module 502 may receive (1) data packets containing template processing instructions from a Storage and Serialization logic module 315 on a data streaming bus 428; and (2) data packets containing a metadata record also from a Storage and Serialization logic module 315 on a data streaming bus 429, and may transmit (1) data packets containing template segment replacement instructions to a Replacement Instruction Decode logic module 503 on a data streaming bus 510 (2) data packets containing checksum replacement instructions to a Checksum Replacement Engine logic module 506 on a data streaming bus 511.

The Instruction Dispatch logic module 502 uses the value of the opcode (operation code) field 521 of each template processing instruction 520, and depending on the value of the opcode, dispatches on a per-instruction basis to either a Replacement Instruction Decode logic module 503 or a Checksum Replacement Unit logic module 506.

A Replacement Instruction Decode logic module 503, receives (1) template segment replacement instructions 522 from an Instruction Dispatch logic module 502 over a data streaming bus 510; and (2) replacement data corresponding to the blank segment of the static template message to be substituted from a Replacement Data Fetch logic module 504 over a data bus 515, and transmits (1) fetch request commands to a Replacement Data Fetch logic module 504 over a data bus 512; and (2) template segment replacement instructions along with the replacement data to a Data Replacement Engine logic module 505 over a data streaming bus 516.

Received template segment replacement instructions are decoded by comparing the value of the source field. Static data sources 536-537-538 contain content which is not affected by reading it, as opposed to the data queues or counters 539-540-541. Accessing any of those last is performed by requesting the Replacement Data Fetch logic module 504.

Segment replacement data is shifted the amount of bytes corresponding to the length of the segment to be replaced to ensure that segment replacement data is aligned on the most significant byte for simplifying the implementation of a Data Replacement Engine logic module 505.

A Replacement Data Fetch logic module 504, receives (1) fetch request commands from a Replacement Instruction Decode logic module 503 over a data bus 512; and (2) the contents of all the data sources instantiated in the Data Buffers logic module 507 over data buses 514, and transmits (1) a read notification to the relevant data source instantiated in the Data Buffers logic module 507 over a bus 513; and (2) the data word to the Replace Instruction Decode logic module 503 over a data bus 515 from the requested data source in the Data Buffers logic module 507.

A Data Replacement Engine logic module 505, receives (1) from the Storage and Serialization logic module 315 data packets containing a static template message on a data streaming bus 427; and (2) template segment replacement instructions along with the replacement data from a Replacement Instruction Decode logic module 503 over a data streaming bus 516, and transmits to the Checksum Replacement Engine logic module 506, data packets containing a message with nearly all or all the original blank segments updated on a streaming data bus 517.

Figure 14:
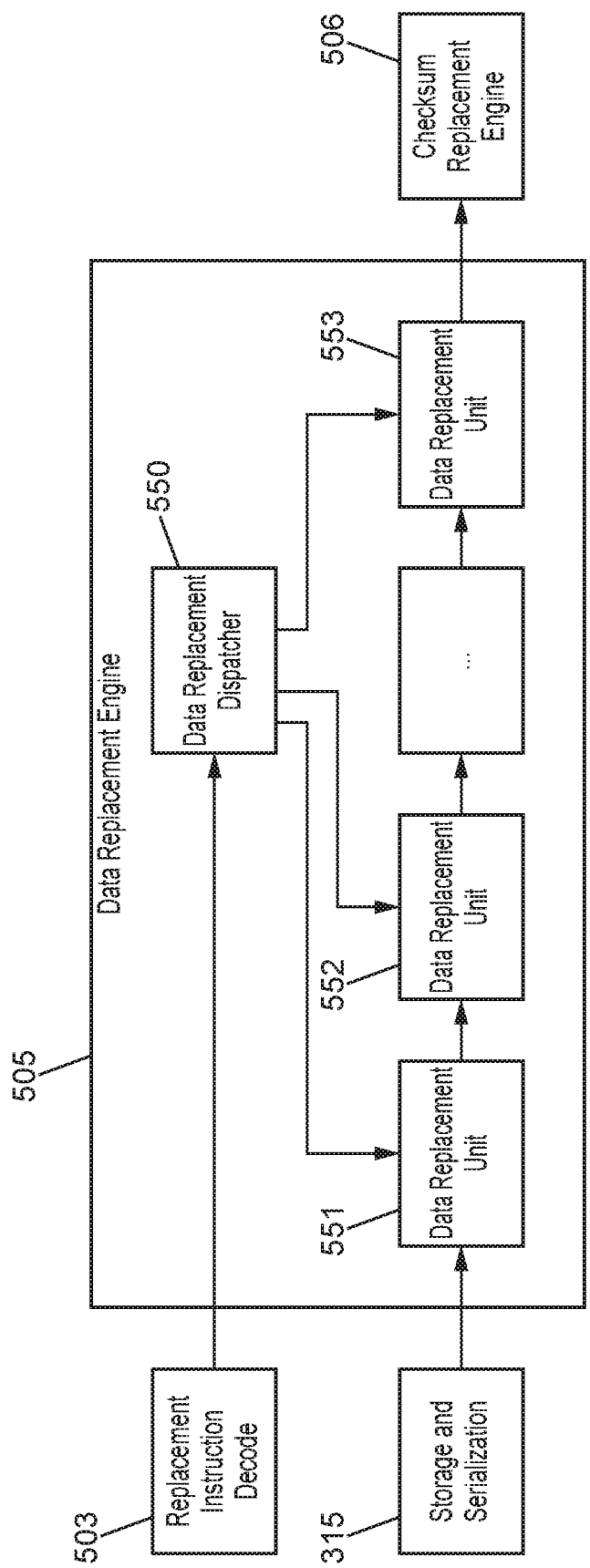
FIG. 14 designates an example of a data replacement engine logic module according to an embodiment.

With reference to FIG. 14, such a Data Replacement Engine logic module may contain a Data Replacement Unit Dispatch logic module 550 which routes replacement data and instruction from the Replacement Instruction Decode logic module 503 to one suitable Data Replacement Unit logic module 551, 552, 553. These logic modules are connected to form a pipeline, with the number of Data Replacement Engine logic modules depending on the application, with four modules being the normal use case.

As shown on FIG. 19, a data packet 1910 containing a series of static message template bytes from the Storage and Serialization logic module, and a data packet 1915 from the Replacement Instruction Decode logic module 503 are processed by the Data Replacement Engine logic module 505 into a data packet containing the segments 534-1917-1918 of data bytes updated 1920 with the received replacement contents.

Figure 13:
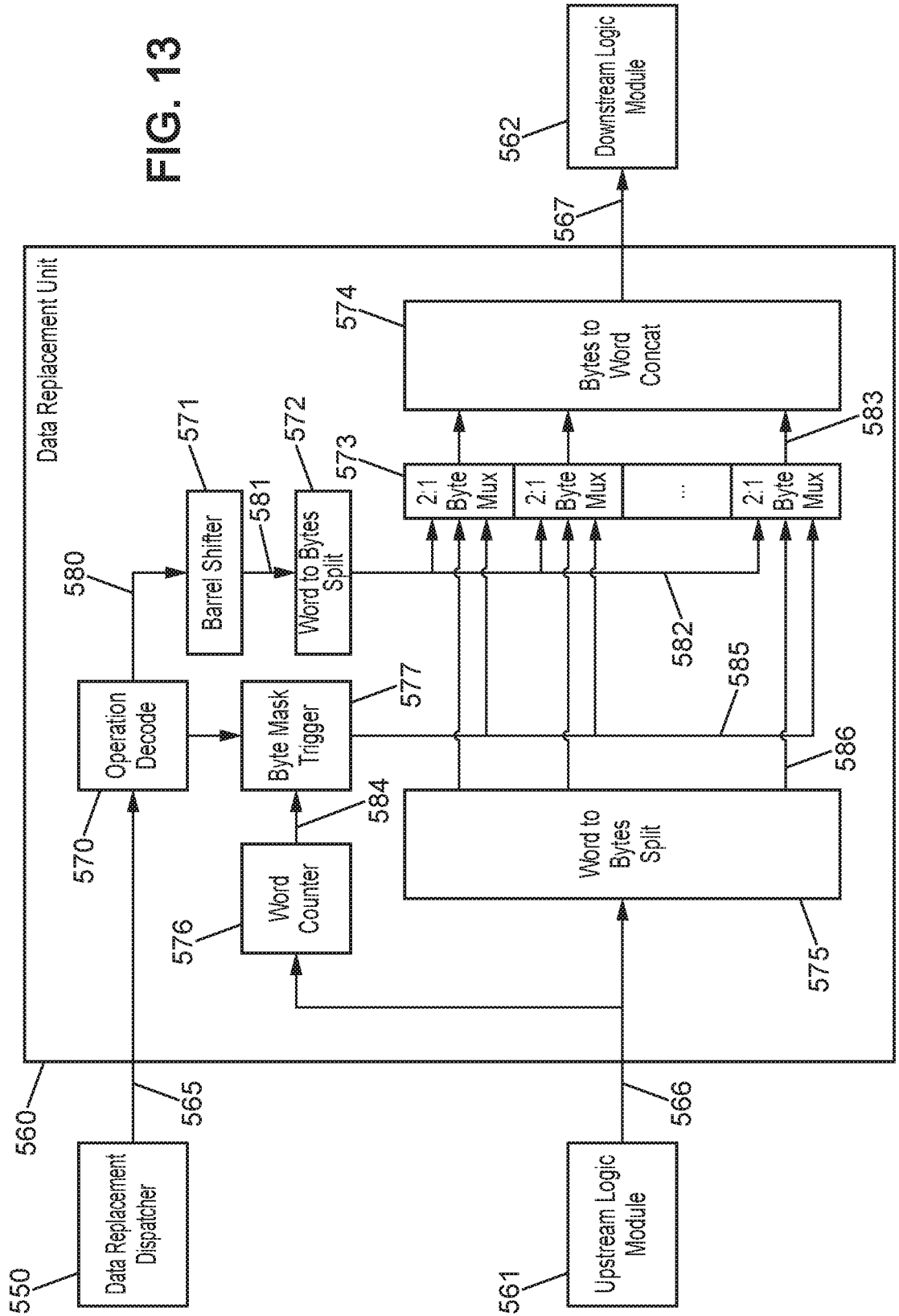
FIG. 13 designates an example of a data replacement unit logic module according to an embodiment.

With reference to FIG. 13, Data Replacement Unit logic module 560 may receive, from a logic module 561 upstream of a data streaming bus 566, data packets containing a static message template with some or none of the blank segments already updated with replacement contents, and transmits to a logic module 562 downstream of a data streaming bus 567, data packets containing a message with some or all of the blank segments now updated with replacement contents. Replacement instructions from a Data Replacement Dispatch logic module 550 containing instructions along with their matching replacement data are received on a bus 565.

An Operation Decode logic unit 570 may decode substitution instructions 522 in one or two elementary instructions depending on whether the bytes to be substituted span across one or two data words. In the latter case, substitution bytes received are split in two sets of bytes corresponding to each elementary instruction. These set of bytes are shifted by a Barrel Shifter logic module 571 the right amount of bytes, as computed from the Start Offset field value 534 in the instruction replace instruction 522, in order to exactly align with the bytes corresponding to the blank fields to be updated.

A Word Counter logic unit 576 tracks the current offset of the static message template packet being received on a data streaming bus 566. The substitution bytes received along the elementary substitution instruction are then used as a replacement each of the bytes present in the current data word. This process is managed by a Byte Mask Trigger logic module 577. Each byte of the data word received from the data streaming bus 566 is split and fed in a set of per-byte two input; one output multiplexers 573. These multiplexers select depending on a per-byte selection signal 585 driven from the Byte Mask Trigger logic module 577, either the byte from the logic module located upstream 561 of the data streaming bus 566, or the replacement data coming from a byte shifter logic module 572.

Figure 15:
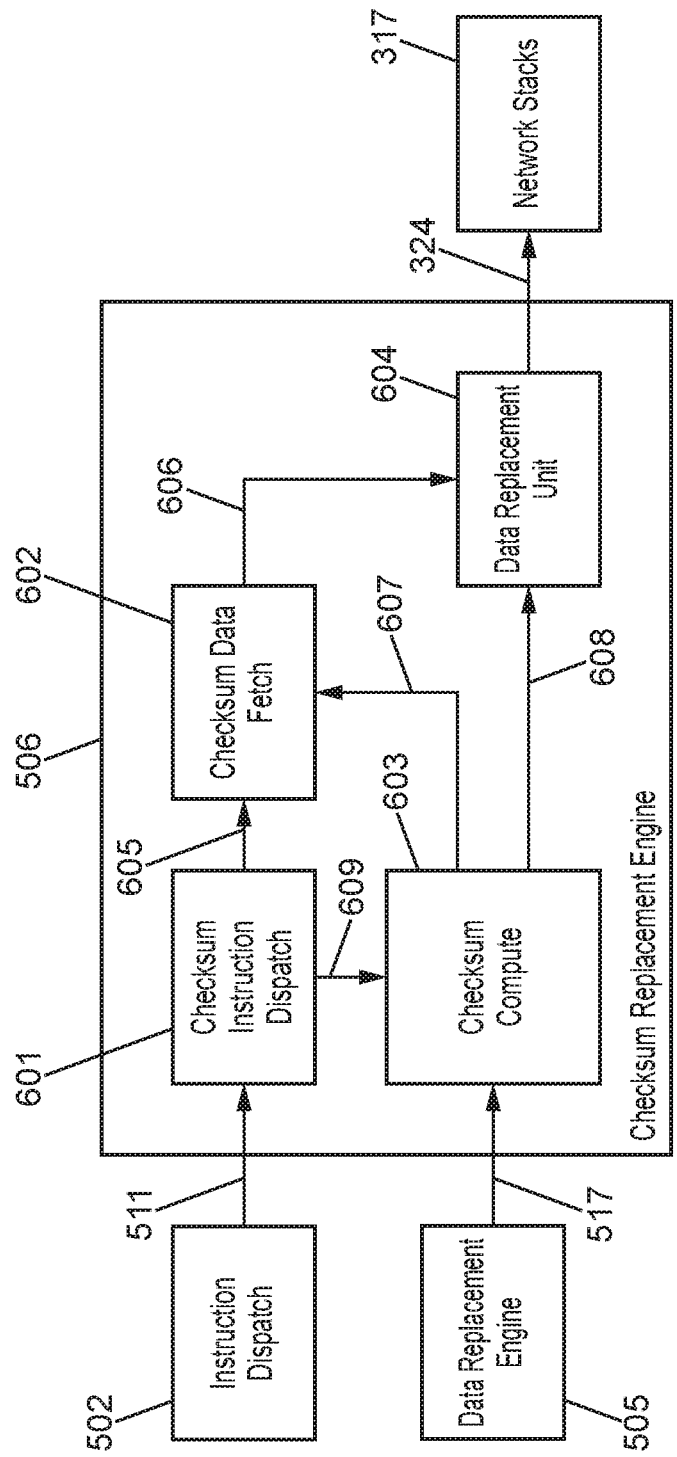
FIG. 15 designates an example of a checksum replacement engine logic module according to an embodiment.

With reference to FIG. 15, a Checksum Replacement Engine logic module 506 may receive, from a Data Replacement Engine logic module 505 upstream of a data streaming bus 517, data packets containing a static message templates with some or all of the blank segments already updated with replacement contents, and transmits to a Egress Interface Mapping and Network Stacks logic module 317 downstream of a data streaming bus 324, data packets containing a message with all of the blank segments now updated with replacement contents. Checksum related instructions are received on a bus 511 from an Instruction Dispatch logic module 502.

A Checksum Compute logic module 603 receives, from (1) a Data Replacement Engine logic module 505 upstream of a data streaming bus 517, data packets containing a static message templates with some or all of the blank segments already updated with replacement contents; and from (2) a Checksum Instruction Dispatch logic module 601 upstream of a data streaming bus 609, data packets containing instructions relevant for computing the checksum value, and transmits, to (1) a Checksum Data Fetch logic module 602 downstream of data bus 607, checksum values; and to (2) a Data Replacement Unit logic module 604 located downstream of a data streaming bus 608, data packets containing a static message templates with some or all of the blank segments already updated with replacement contents.

A Checksum Compute instruction 523 specifies a checksum algorithm 532; a start offset 534; and a length 535.

A Data Replacement Unit logic module 604 receives, from (1) a Checksum Compute logic module 603 upstream of a data streaming bus 608, data packets containing a static message templates with some or all of the blank segments already updated with replacement contents; and from (2) a Checksum Data Fetch logic module 602 upstream of a data streaming bus 606, replacement instructions containing instructions along with their matching checksum replacement data, and transmits, to a Egress Interface Mapping and Network Stacks logic module 317 downstream of a data streaming bus 324, data packets containing a message with all of the blank segments now updated with replacement contents.

The implementation of this Data Replacement Unit logic module is identical to the one instantiated in the Data Replacement Engine logic module 560.

Figure 16:
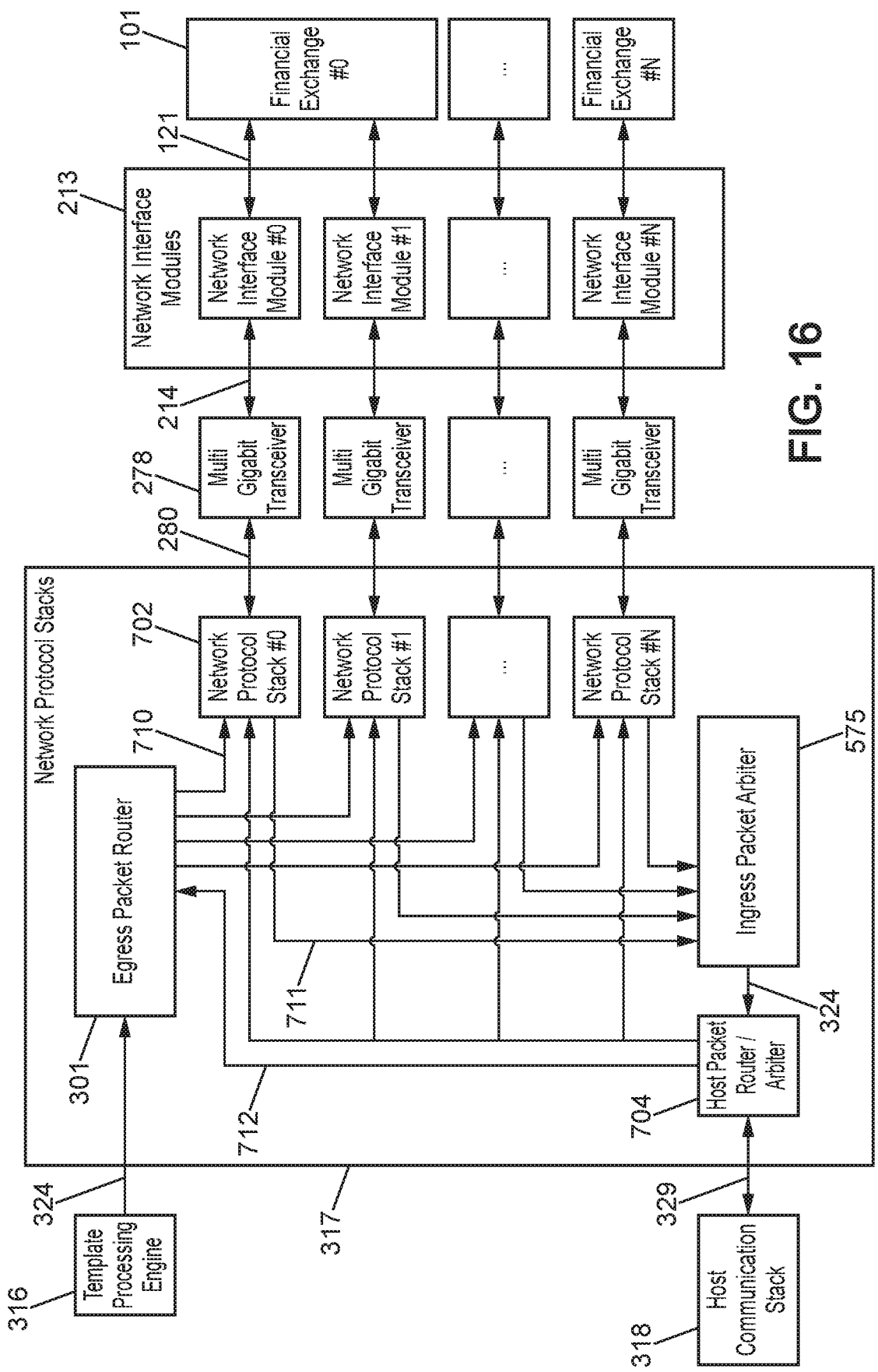
FIG. 16 designates an example of a network protocol stacks logic module according to an embodiment.

With reference to FIG. 16, a Network Protocol Stacks logic module 317 may receive, from (1) a Template Processing Engine logic module 316 upstream of a data streaming bus 324, data packets containing a message with all of the blank segments now updated with replacement contents; and from (2) a Host Communication Stack logic module 318 through a bidirectional data streaming bus 329, configuration data and outbound data packets, and exchanges, to all the relevant network interface modules 213 via the corresponding multi-gigabit transceiver 278, data packets containing the relevant network headers footers along with payload contents.

Relevant network interface modules 213 are connected via an electronic communication network 121 to a financial exchange 101.

An Egress Packet Router logic module 301 receives, from (1) a Template Processing Engine logic module 316 upstream of a data streaming bus 324, data packets containing a message with all of the blank segments now updated with replacement contents along with the metadata record contents; and from (2) a Host Packet Router and Arbiter logic module 704 upstream of a data streaming bus 712, outbound data packets, and transmits, to the relevant Network Protocol Stack module 702 downstream of a data streaming bus 710, data packets containing a message with all of the blank segments now updated with replacement contents.

Data packets coming from the Template Processing Engine 316 are routed to the relevant Network Protocol Stack logic module 702, according to the TCP Session Index value specified in the metadata record transmitted on the side-band channel of the data streaming bus 324.

Outbound data packets crafted by the software program running on the server computer CPU 221, are received on a data streaming bus 712. These packets are buffered and routed to the relevant Network Protocol Stack logic module 702 according to the TCP Session Index value specified in the side-band channel of the data streaming bus 712.

The invention claimed is:

1. A method for simultaneously generating a plurality of data packets to be transmitted across a communication network, each data packet comprising at least one order entry message forming a data payload, the method comprising executing on a processing circuit:
    obtaining a plurality of memory update data packets comprising at least:
        directory type memory update data packets,
        static message type memory update data packets,
        template processing instructions type memory update data packets,
    for each directory type memory update data packet, updating a directory entry of a directory, based on said directory type memory update data packet,
    for each static message type memory update data packet, updating a static message template, based on the static message type memory update data packet,
    for each template processing instructions type memory update data packet, updating a template processing instruction dataset to provide guidance to process an updated static message template, based on the template processing instructions type memory update data packet,
    generating simultaneously all the data packets of said plurality of data packets according to a sequence synchronized in parallel and comprising for each data packet:
        obtaining content request data for said order entry message, comprising a request index,
        selecting an updated directory entry based on the request index,
        for the selected updated directory entry, selecting at least one updated static message template and at least one updated template processing instruction dataset based on the selected updated directory entry,
        for the selected updated directory entry, processing the selected updated static message template based on the selected updated template processing instruction dataset to generate the data packet,
    routing simultaneously the thusly generated data packets to respective network interface modules for transmitting simultaneously the plurality of generated data packets across the communication network.

2. The method of claim 1, the method further comprising, prior to simultaneously generating each data packet of the plurality of data packets:
    obtaining a trading signal;
    processing the trading signal using a trading strategy algorithm module to generate a trigger request;
    and decoding the trigger request to obtain the content request data for said order entry message.

3. The method of claim 1, wherein:
    the template processing instructions type memory update data packets comprise:
        content to be added to an updated static message template,
        instructions for processing the updated static message template to add said content;
    updating the template processing instruction datasets is based on said content and on said instructions;
    processing the selected updated static message template based on the selected updated template processing instruction dataset to generate the data packet comprises adding said content to said selected updated static message template according to said instructions.

4. The method of claim 1, wherein:
    the selected updated directory entry comprises at least a first datablock address, a first datablock length, a second datablock address, and a second datablock length;
    selecting the updated static message template comprises reading, in a first memory, a first datablock having a length corresponding to the first datablock length, starting from an address corresponding to the first datablock address;
    selecting the updated template processing instruction dataset comprises reading, in a second memory, a second datablock having a length corresponding to the second datablock length, starting from an address corresponding to the second datablock address;
    and processing the selected updated static message template based on the selected updated template processing instruction dataset to generate the data packet comprises processing said first datablock based on the second datablock.

5. The method of claim 1, wherein the memory update data packets further comprise metadata type memory update data packets, and the method further comprises:

for each metadata type memory update data packet, updating a metadata record based on the metadata type memory update data packet, the synchronized sequence further comprises:
for the selected updated directory entry, selecting a metadata record based on the selected updated directory entry, and
processing the selected updated static message template to generate the data packet is further based on the selected metadata record.

6. The method of claim 5, wherein:
each updated directory entry comprises at least a datablock index value;
selecting the metadata record comprises reading, in a third memory, a third datablock at an address corresponding to the datablock index value;
and processing the selected updated static message template to generate the data packet comprises processing the generated data packet to include the third datablock.

7. The method of claim 1, wherein:
the content request data for said order entry message further comprises forwarded content data to be included in the data packet;
and the method further comprises further processing the generated data packet to include the forwarded content data.

8. The method of claim 1, wherein each updated directory entry comprises an arm flag, the method further comprising, prior to obtaining the content request data:
checking each updated directory entry to determine whether the data packet that would be generated by selecting at least one updated static message template and at least one updated template processing instruction dataset based on said updated directory entry, and processing the selected updated static message template based on the selected updated template processing instruction dataset to generate the data packet, is non-corrupted,
if said data packet that would be generated is non-corrupted, enabling the arm flag of said updated directory entry, and
if said data packet that would be generated is corrupted, disabling the arm flag of said updated directory entry.

9. The method of claim 1, wherein:
prior to obtaining the content request data, each updated directory entry comprises an enabled arm flag and a reissue flag,
upon processing the selected updated static message template to generate the data packet, enablement of the reissue flag for the selected updated directory entry is checked,
the method further comprising,
if the reissue flag is disabled, disabling the arm flag;
if the reissue flag is enabled, maintaining the arm flag enabled.

10. The method of claim 9, further comprising:
obtaining a subsequent content request data for said order entry message, comprising a request index,
selecting a subsequent updated directory entry based on the request index,
checking enablement of the arm flag for the subsequent updated directory entry,
if said arm flag for the subsequent updated directory entry is enabled:
selecting at least a subsequent updated static message template and at least a subsequent updated template processing instruction dataset based on the selected subsequent updated directory entry,
and processing the selected subsequent updated static message template based on the selected subsequent updated template processing instruction dataset to generate a subsequent data packet;
if said arm flag for the subsequent updated directory entry is disabled,
not generating the subsequent data packet,
and transmitting a value associated to the subsequent updated directory entry.

11. The method of claim 1, wherein:
the synchronized sequence further comprises computing a checksum of the generated data packet and further processing the generated data packet to insert the computed checksum.

12. A non-transitory computer storage medium storing instructions of a computer program wherein an execution of said instructions by a processing circuit causes an implementation of the method according to claim 1.

13. A device for simultaneously generating a plurality of data packets to be transmitted across a communication network, each data packet comprising at least one order entry message forming a data payload, the device comprising a processing circuit configured for:
obtaining a plurality of memory update data packets comprising at least:
directory type memory update data packets,
static message type memory update data packets,
template processing instructions type memory update data packets,
for each directory type memory update data packet, updating a directory entry of a directory, based on said directory type memory update data packet,
for each static message type memory update data packet, updating a static message template, based on the static message type memory update data packet,
for each template processing instructions type memory update data packet, updating a template processing instruction dataset to provide guidance to process an updated static message template, based on the template processing instructions type memory update data packet,
generating simultaneously all the data packets of said plurality of data packets according to a sequence synchronized in parallel and comprising for each data packet:
obtaining content request data for said order entry message, comprising a request index,
selecting an updated directory entry based on the request index,
for the selected updated directory entry, selecting at least one updated static message template and at least one updated template processing instruction dataset based on the selected updated directory entry,
for the selected updated directory entry, processing the selected updated static message template based on the selected updated template processing instruction dataset to generate the data packet,
routing simultaneously the thusly generated data packets to respective network interface modules for transmitting simultaneously the plurality of generated data packets across the communication network.

14. The device of claim 13, wherein the processing circuit comprises:
at least one clock;
a plurality of groups of interconnected logic blocks;

each group of said plurality of groups of interconnected logic blocks being configured for generating one of the data packets of said plurality of data packets according to said sequence;

said plurality of groups of interconnected logic blocks being simultaneously synchronized by said clock for synchronizing said sequence in parallel.

15. The device of claim 13, wherein the processing circuit comprises:
a plurality of order entry engines, each order entry engine being configured for generating one of the data packets of said plurality of data packets according to said sequence;
each order entry engine of the plurality of order entry engines comprising:
a request decoder module for obtaining content request data for said order entry message, comprising a request index,
a storage and serialization module for:
selecting an updated directory entry based on the request index,
selecting, for the selected updated directory entry, at least one updated static message template and at least one updated template processing instruction dataset based on the selected updated directory entry,
a template processing module for processing, for the selected updated directory entry, the selected updated static message template based on the selected updated template processing instruction dataset to generate the data packet,
a network protocol module for routing the thusly generated data packet to a network interface module.

* * * * *